(12) United States Patent　　　　　(10) Patent No.:　US 12,570,117 B2

Todman　　　　　(45) Date of Patent: 　Mar. 10, 2026

(54) ECCENTRIC CONTROL-ARM BUSHINGS AND SUSPENSION SYSTEMS USING THEM

(71) Applicant: REE AUTOMOTIVE LTD., Kibbutz Glil-Yam (IL)

(72) Inventor: Peter Todman, York (GB)

(73) Assignee: REE AUTOMOTIVE LTD, Glil-Yam (IL)

( * ) Notice: Subject to any disclaimer, the term of this patent is extended or adjusted under 35 U.S.C. 154(b) by 0 days.

(21) Appl. No.: 18/979,676

(22) Filed: Dec. 13, 2024

(65) Prior Publication Data

US 2025/0108672 A1　　Apr. 3, 2025

Related U.S. Application Data

(63) Continuation of application No. PCT/IB2023/059931, filed on Oct. 3, 2023.

(Continued)

(51) Int. Cl.
*B60G 7/02*　　　　(2006.01)
*B60G 3/20*　　　　(2006.01)
*B60G 7/00*　　　　(2006.01)

(52) U.S. Cl.
CPC .............. *B60G 7/02* (2013.01); *B60G 7/001* (2013.01); *B60G 3/20* (2013.01); *B60G 2200/156* (2013.01); *B60G 2204/4103* (2013.01)

(58) Field of Classification Search
CPC . B60G 7/02; B60G 7/001; B60G 3/20; B60G 2200/156; B60G 2204/4103;
(Continued)

(56) References Cited

U.S. PATENT DOCUMENTS

| 3,572,677 | A | | 3/1971 | Damon | |
| 6,419,215 | B1 | * | 7/2002 | Johnson ................... | B60G 7/02 |
| | | | | | 267/140.3 |

(Continued)

FOREIGN PATENT DOCUMENTS

| CN | 113059971 | A | * | 7/2021 | ............. B60G 15/00 |
| GB | 533960 | A | | 2/1941 | |
| KR | 200169118 | Y1 | | 3/2000 | |

OTHER PUBLICATIONS

Translation of CN-113059971-A; Jul. 2, 2021 (Year: 2021).*

(Continued)

*Primary Examiner* — Paul N Dickson
*Assistant Examiner* — Shams Dhanani
(74) *Attorney, Agent, or Firm* — PEARL COHEN ZEDEK LATZER BARATZ LLP

(57) ABSTRACT

A suspension system for a vehicle platform comprises a control arm comprising an outboard portion and one or more inboard portions, and one or more eccentric bushings for linking the control arm to a frame of the vehicle platform. Each of the one or more bushings includes an annular outer sleeve seated in an opening of a respective inboard portion of the one or more inboard portions, an inner sleeve assembly nonconcentrically surrounded by the annular outer sleeve, for fixed coupling to the frame of the vehicle platform, and an elastomeric material bonded to both the outer sleeve and the inner sleeve assembly, the elastomeric material being at least partly deformable to absorb a torque applied thereto by the outer sleeve.

20 Claims, 11 Drawing Sheets

END VIEW

Related U.S. Application Data

(60) Provisional application No. 63/414,014, filed on Oct. 7, 2022.

(58) Field of Classification Search
CPC .......... B60G 2200/144; B60G 2204/41; B60G 2204/129; B60G 2204/143; B60G 2204/4104; F16F 1/3873; F16F 1/38
See application file for complete search history.

(56) References Cited

U.S. PATENT DOCUMENTS

| | | | | |
|---|---|---|---|---|
| 6,446,993 | B1 * | 9/2002 | Huszarik | B60G 7/02 280/124.1 |
| 2004/0201196 | A1 * | 10/2004 | Katagiri | B60G 7/02 280/124.134 |
| 2005/0051987 | A1 * | 3/2005 | Saitoh | F16F 1/3873 280/124.134 |
| 2008/0203693 | A1 * | 8/2008 | Yamada | B60G 3/01 280/124.127 |
| 2009/0295051 | A1 * | 12/2009 | Kim | B60G 21/052 267/293 |
| 2013/0001915 | A1 * | 1/2013 | Yamada | B60G 7/02 280/124.177 |
| 2013/0200587 | A1 * | 8/2013 | Branger | F16F 1/3814 280/124.13 |
| 2016/0052357 | A1 * | 2/2016 | Cha | F16F 1/3863 29/896.91 |
| 2019/0054786 | A1 * | 2/2019 | Hester | F16F 1/3873 |
| 2020/0130449 | A1 * | 4/2020 | Hoyer | B60G 7/001 |
| 2020/0207170 | A1 * | 7/2020 | Hosoda | F16F 1/3828 |
| 2020/0317039 | A1 * | 10/2020 | Chung | B60K 1/04 |
| 2021/0039464 | A1 * | 2/2021 | Knapp | F16F 3/0935 |
| 2021/0276391 | A1 * | 9/2021 | Nam | B60G 21/0551 |
| 2022/0048350 | A1 | 2/2022 | Karlsson | |
| 2023/0124438 | A1 * | 4/2023 | Lee | B60G 7/008 267/153 |
| 2023/0150326 | A1 * | 5/2023 | Furuse | B60G 7/02 280/124.11 |
| 2023/0302860 | A1 * | 9/2023 | Jeon | B62D 5/0418 |
| 2023/0311636 | A1 * | 10/2023 | Jeon | B60G 7/008 180/55 |
| 2023/0339277 | A1 * | 10/2023 | Kim | B60G 21/052 |
| 2023/0391154 | A1 * | 12/2023 | Choi | B60K 7/0007 |

OTHER PUBLICATIONS

PCT search opinion for PCT/IB2023/059931 which mailed on Feb. 14, 2024.
PCT search report for PCT/IB2023/059931 which mailed on Feb. 14, 2024.

* cited by examiner

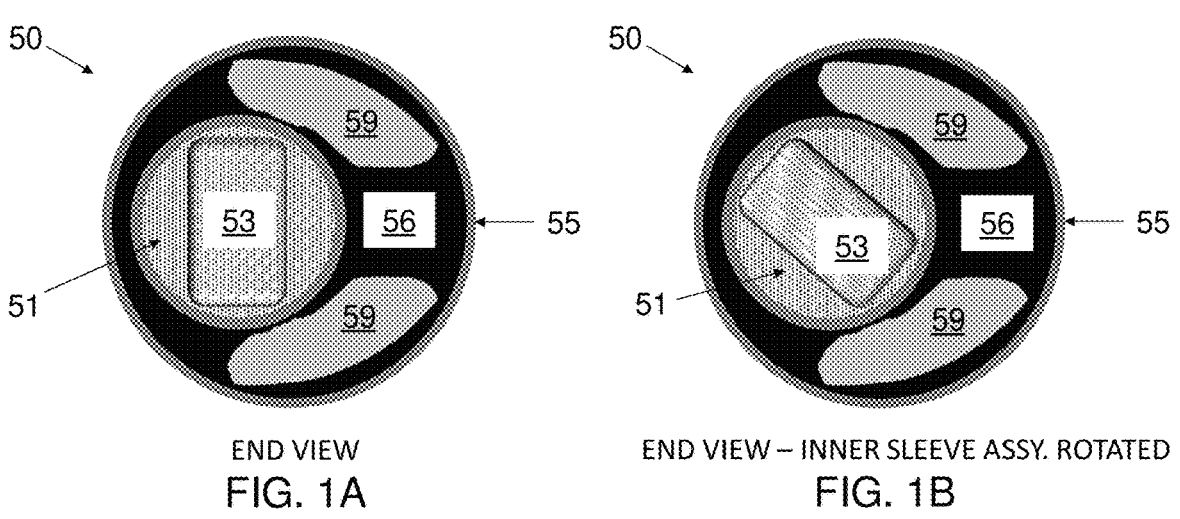
END VIEW
FIG. 1A
END VIEW – INNER SLEEVE ASSY. ROTATED
FIG. 1B
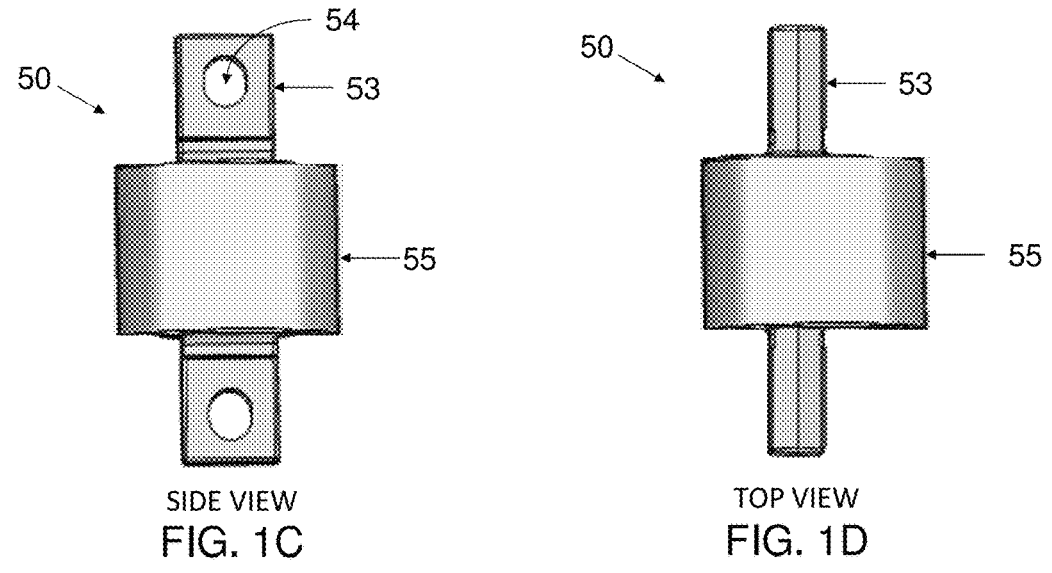
SIDE VIEW
FIG. 1C
TOP VIEW
FIG. 1D
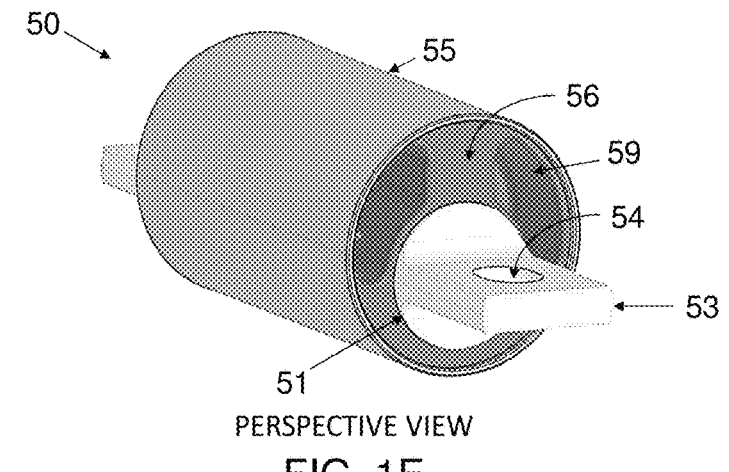
PERSPECTIVE VIEW
FIG. 1E

OUTBOARD ◄-------- *900* --------► INBOARD

OUTBOARD ◄-------- *900* --------► INBOARD

INBOARD ←------ *910* ------→ OUTBOARD

OUTBOARD ←------ *900* ------→ INBOARD

*930* DIRECTION OF TRAVEL

TOP VIEW

OUTBOARD

*901*

INBOARD

BOTTOM VIEW

OUTBOARD

*901*

INBOARD

OUTBOARD ← ----------- *900* ----------- → INBOARD

OUTBOARD ← ----------- *900* ----------- → INBOARD

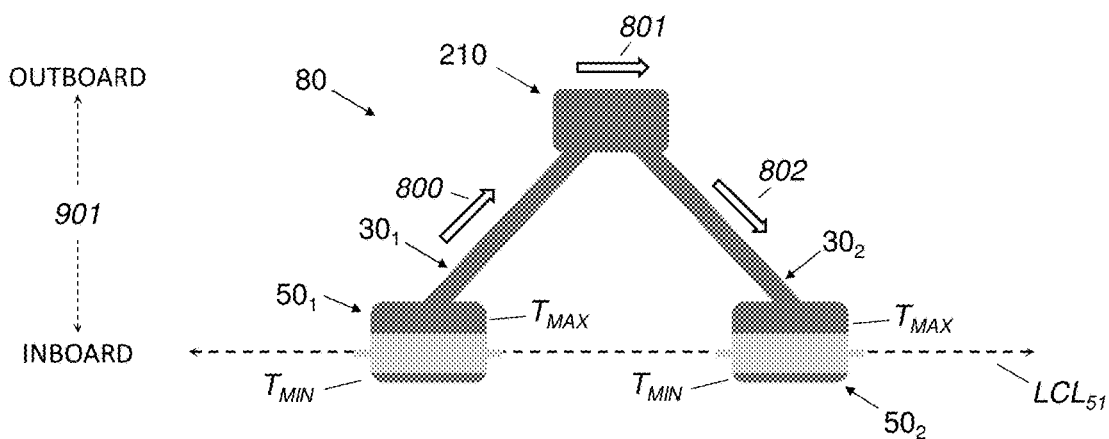
FIG. 9A
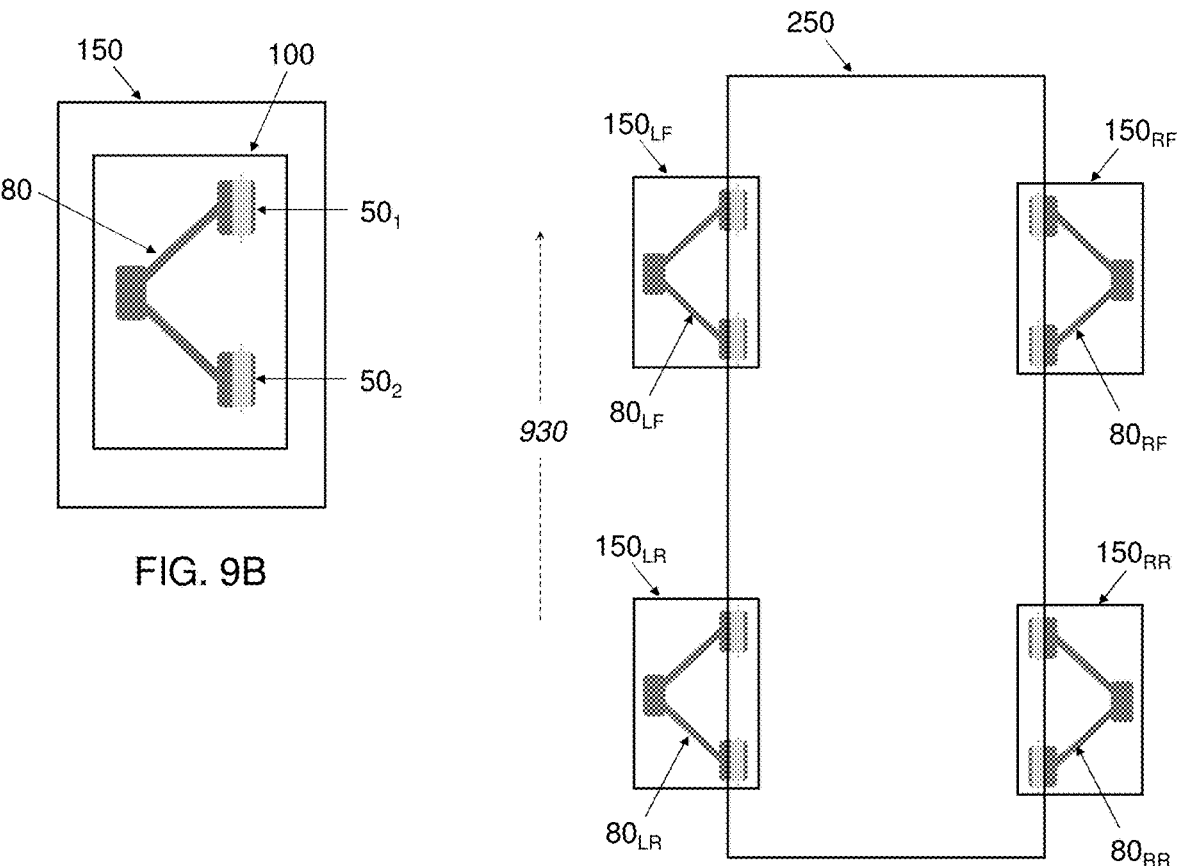
FIG. 9B
FIG. 9C

RIDE

BUMP

RIDE

BUMP

4% ROLL – CONVENTIONAL BUSHINGS

<4% ROLL – ECCENTRIC BUSHINGS

ECCENTRIC CONTROL-ARM BUSHINGS AND SUSPENSION SYSTEMS USING THEM

CROSS-REFERENCE TO RELATED APPLICATIONS

The present application is a continuation of PCT International Application No. PCT/IB2023/059931, filed on Oct. 3, 2023, claiming priority to U.S. Provisional Patent Application No. 63/414,014, filed Oct. 7, 2022, which is incorporated herein by reference in its entirety.

FIELD OF THE INVENTION

The present invention relates to vehicle suspension systems and particularly to suspension systems comprising one or more eccentric control arm bushing, as well as to eccentric control arm bushings.

BACKGROUND

Bearings are commonly used to couple control arms of a suspension system to a vehicle frame. In some applications, the bushings serve as flexible bearings constructed to include an outer cylindrical sleeve seated in an opening of a control arm, and an inner cylindrical sleeve adapted for attachment to the vehicle frame. The outer sleeve and the inner sleeve are concentrically aligned so that the control arm, when acted upon, pivots around both the outer sleeve and the inner sleeve. The annular gap between the inner and outer sleeves can be filled or partly filled with an elastomeric material, often selected for its mechanical characteristics and design. The elastomeric material serves to help isolate passengers and cargo from vibration.

In many applications, design is based on whether the bushing is to be installed as a leading bushing or a trailing bushing in forward motion of the vehicle, and the bushing selected to be used as the leading bushing is typically different—e.g., stiffer in tension to better control geometry—than the one used as the trailing bushing, which is typically more compliant and tunable, and provides better isolation. This means that more parts are needed for vehicle assembly and maintenance, as the bushings, or control-arm and suspension assemblies with installed bushings, are not interchangeable.

In vehicles in which the space allotted for a suspension control arm, and in particular an upper control arm, is limited, a relatively short control arm equipped with conventional bushings has known drawbacks. Longer control arms are known to be preferable for vehicle stability; when conventional bushings are installed in the short control arms of limited-size suspension packages, they may contribute to high degrees of vehicle instability due to roll center migration in bump or rebound conditions.

Eccentric bushings, i.e., bushings having non-concentrically aligned inner and outer sleeves, have been in use for high-performance vehicles such as race cars. In known prior-art eccentric bushings, the gap between inner and outer sleeves is filled with a mostly rigid solid such as a metal or a hard polymer. The resulting design based on a solid gap material lacks compliance as would be preferred for a street vehicle. Moreover, the control arm still pivots conventionally about the center of the inner sleeve of bushing without virtually lengthening the control arm length.

There is a need for a bushing design that improves the stability of vehicles, e.g., during bump and rebound phases of the suspension, and especially in vehicles equipped with independent suspension systems that have minimal space available for control-arm length, such as upper control-arm length. There is also a need for a bushing design that can be used interchangeably in both the leading and trailing positions while providing differential stiffness to the leading bushing and differential compliance to the trailing bushing.

SUMMARY

The embodiments disclosed herein relate to suspension systems, control arms and control-arm bushings, as well as vehicle corner modules (VCMs) and vehicles incorporating them.

According to embodiments of the present disclosure, a suspension system for a vehicle platform comprises: (a) a control arm comprising an outboard portion and one or more inboard portions; and (b) one or more eccentric bushings for linking the control arm to a frame of the vehicle platform. Each of the one or more bushings comprises: (i) an annular outer sleeve seated in an opening of a respective inboard portion of the one or more inboard portions, (ii) an inner sleeve assembly nonconcentrically surrounded by the annular outer sleeve for fixed coupling to the frame of the vehicle platform, and (iii) an elastomeric material bonded to both the outer sleeve and the inner sleeve assembly, the elastomeric material being at least partly deformable to absorb a torque applied thereto by the outer sleeve.

In some embodiments, each of the one or more bushings can be oriented such that a central longitudinal axis of the inner sleeve assembly is disposed inboardward of a parallel, central axis of the opening of the inboard portion.

In some embodiments, the elastomeric material can be molded to partly fill a gap between the outer sleeve and the inner sleeve.

In some embodiments, it can be that when an at least partly vertical force is received by the outboard portion of the control arm to pivot the control arm about the bushing while the inner sleeve assembly is constrained to a fixed disposition, the pivoting is constrained by the elastomeric material, and a central longitudinal axis of the annular outer sleeve is displaced both vertically and inboardwardly along an arc relative to the central longitudinal axis of the inner sleeve assembly. In some embodiments, the vertical displacement can be greater than the inboardward displacement.

In some embodiments, it can be that when an at least partly vertical force is received by the outboard portion of the control arm while the inner sleeve assembly is constrained to a fixed disposition, the control arm is constrained to pivot eccentrically about a virtual pivot axis that is displaced inboardward from the central axis of the inner sleeve assembly. In some embodiments, the virtual pivot axis can be displaced to be external to the inner sleeve assembly. In some embodiments, the virtual pivot axis can be displaced to be external to the bushing.

In some embodiments, pivoting of the control arm about the virtual pivot axis can extend an effective length of the control arm.

In some embodiments, the eccentricity of the bushing can be such that a maximum radial thickness of the partly filled gap is at least twice as thick as a minimum radial thickness thereof.

In some embodiments, the control arm can comprise exactly two inboard portions and two eccentric bushings, e.g., seated therewithin, a respective eccentric bushing being seated in each of the two inboard portions. In some embodiments, each of the two eccentric bushings can be oriented such that a central longitudinal axis of the inner sleeve assembly is disposed inboardward of a parallel, central axis of the opening of the respective inboard portion. In some embodiments, the two eccentric bushings can both be oriented such that for each eccentric bushing, a maximum radial thickness of the partly filled gap is disposed outboardward of the inner sleeve assembly and the minimum radial thickness of the partly filled gap is disposed inboardward of the inner sleeve assembly.

In some embodiments, a vehicle corner module (VCM) can comprise the suspension system of any one of the embodiments disclosed hereinabove.

In some of the foregoing embodiments, a vehicle platform can comprise a suspension system as disclosed hereinabove, wherein of the two inboard portions of the control arm, a first inboard portion is a leading inboard portion and a second inboard portion is a trailing inboard portion.

In some of the foregoing embodiments, a vehicle platform can comprise first and second suspension systems as disclosed hereinabove, and the first and second suspension systems can be mounted on opposing sides of the vehicle platform and rotated, in a horizontal plane, 180° relative to each other, such that of the two inboard portions of the control arm of each suspension assembly, a first inboard portion is a leading inboard portion and a second inboard portion is a trailing inboard portion. In such embodiments, the control arm bushings of the various leading and trailing inboard portions can all be of the same design. In some embodiments, the eccentricity of the bushings can be such that in a forward driving mode, the bushing seated in the leading inboard portion of the control arm of each of the first and second suspension assemblies provides greater stiffness than the bushing of like design and orientation seated in the opening of the respective trailing inboard portion. In some embodiments, the eccentricity of the bushings can be such that in a forward driving mode, the bushing seated in the trailing inboard portion of the control arm of each of the first and second suspension assemblies provides more compliance than the bushing of like design and orientation seated in the opening of the respective leading inboard portion.

According to embodiments of the present disclosure, an eccentric control-arm bushing, for an inboard portion of a control arm, comprises: (a) an annular outer sleeve configured to be seated in an opening in the inboard portion; (b) an inner sleeve assembly nonconcentrically surrounded by the outer sleeve and configured for being coupled to a frame of a vehicle platform; and (c) an elastomeric material bonded to both the outer sleeve and the inner sleeve and molded to partly fill a gap therebetween, and at least partly deformable by a torque transmitted thereto by the outer sleeve, the nonconcentric surrounding being such that a maximum radial thickness of the partly filled gap is at least twice as thick as a minimum radial thickness thereof.

In some embodiments, the inner sleeve assembly can comprise one or more connection members at least partly extending axially from the bushing and configured for making a bolted connection to the frame of the vehicle platform.

In some embodiments, it can be when the bushing is installed in the opening in the inboard portion of the control arm and oriented such that a central longitudinal axis of the inner sleeve assembly is disposed inboardward of a parallel, central axis of the opening, and when a vertical force is received by an outboard portion of the control arm while the inner sleeve assembly is constrained to a fixed disposition, a central longitudinal axis of the annular outer sleeve is displaced both vertically and inboardwardly along an arc relative to the central longitudinal axis of the inner sleeve assembly.

In some embodiments, the bushing can be installed in the opening in the inboard portion of the control arm and oriented such that a central longitudinal axis of the inner sleeve assembly is disposed inboardward of a central axis of the opening, and when a vertical force is received by an outboard portion of the control arm while the inner sleeve assembly is constrained to a fixed disposition, the control arm is constrained by the bushing to pivot eccentrically about a virtual pivot axis displaced inboardward from the central longitudinal axis of the inner sleeve assembly.

In some embodiments, a control arm of a suspension system can comprise: (a) an opening proximal to an end of the control arm; and (b) an eccentric bushing according to any one of the embodiments disclosed hereinabove, seated in the opening.

According to embodiments of the present disclosure, a vehicle platform comprises: first and second vehicle corner modules (VCMs) mounted on opposite sides of the vehicle platform, the first and second VCMs comprising respective suspension assemblies rotated 180° in a horizontal plane relative to each other, each of the first and second suspension assemblies including a control arm including two inboard portions, each of the two inboard portions including a respective opening and an eccentric bushing installed therein, each of the two respective bushings comprising: (i) an annular outer sleeve seated in the respective opening, (ii) an inner sleeve assembly nonconcentrically surrounded by the outer sleeve and non-pivotably coupled to a frame of the vehicle platform, and (iii) an elastomeric material bonded to both the outer sleeve and the inner sleeve assembly, molded to partly fill a gap therebetween, and at least partly deformable to absorb a torque applied thereto by the outer sleeve, a maximum radial thickness of the partly filled gap being at least twice as thick as a minimum radial thickness thereof, wherein the two respective bushings are both oriented such that for each bushing, the maximum radial thickness of the partly filled gap is disposed outboardward of the inner sleeve assembly and the minimum radial thickness of the partly filled gap is disposed inboardward of the inner sleeve assembly.

In some embodiments, the eccentricity of the bushings can be such that in a forward driving mode, the bushing of the leading inboard portion of the respective control arm of each of the first and second suspension provides greater stiffness than the bushing of like design and orientation seated in the opening of the respective trailing inboard portion. In some embodiments, the eccentricity of the bushings can be such that in a forward driving mode, the bushing of the trailing inboard portion of the control arm of each of the first and second suspension assemblies provides more compliance than the bushing of like design and orientation seated in the opening of the respective leading inboard portion.

According to embodiments of the present disclosure, a vehicle corner module (VCM) comprises a suspension system, the suspension system comprising a control arm and a plurality of control arm bushings installed in respective openings in a plurality of inboard portions of the control arm, wherein (i) in a first orientation of the VCM, a first control arm bushing is a leading control arm bushing and a second control arm bushing is a trailing control arm bushing, and (ii) in a second orientation of the VCM that is rotated 180° in a horizontal plane relative to the first orientation, the first control arm bushing is a trailing control arm bushing and the second control arm bushing is a leading control arm bushing, wherein: each of the first and second control arm bushings comprises (i) an annular outer sleeve seated in the opening of the respective inbound portion of the control arm, (ii) an inner sleeve assembly nonconcentrically surrounded by the outer sleeve and configured for fixed coupling to a frame of a vehicle platform, and (iii) an elastomeric material bonded to both the outer sleeve and the inner sleeve assembly, molded to partly fill a gap therebetween, and at least partly deformable to absorb a torque applied thereto by the outer sleeve, a maximum radial thickness of the partly filled gap being at least twice as thick as a minimum radial thickness thereof, wherein the two bushings are both oriented such that for each bushing, the maximum radial thickness of the partly filled gap is disposed outboardward of the inner sleeve assembly and the minimum radial thickness of the partly filled gap is disposed inboardward of the inner sleeve assembly.

In some embodiments, the VCM can be configured to be mounted on a first side of a vehicle platform when in the first orientation, and is configured to be mounted on a second side of the VCM when in the second orientation.

In some embodiments, the being mounted can include non-pivotably coupling of the respective inner sleeve assemblies of the control arm bushings to a frame of the vehicle platform.

In some embodiments, the first and second control arm bushings can be of substantially the same design.

According to embodiments of the present disclosure, a vehicle platform comprises: first and second vehicle corner modules (VCMs) mounted on opposite sides of the vehicle platform, and comprising respective suspension assemblies, each of the respective suspension assemblies comprising a control arm, the control arm including two inboard portions, each inboard portion including an eccentric bushing installed in an opening therein, each of the two bushings of the control arm being oriented such that for each bushing, a central longitudinal axis of the bushing is disposed inboardward of a parallel, central axis of the respective opening, wherein, when a respective at least partly vertical force is received by an outboard portion of the respective control arms of the suspension assemblies to pivot the control arms about the respective bushings, (i) each of the control arms is constrained to pivot eccentrically about respective virtual pivot axes that are displaced inboardward from central axes of inner sleeve assemblies of the two respective bushings installed in the inboard-portion openings of each of the control arms, and (ii) the eccentric pivoting of the control arms about the respective virtual pivot axes extends an effective length of each control arm, and is effective to constrain a negatively vertical displacement of a roll center of the vehicle platform.

In some embodiments, the virtual pivot axes can be displaced inboardward by the eccentric pivoting.

In some embodiments, each of the eccentric bushings can comprise (i) an annular outer sleeve seated in the opening, (ii) an inner sleeve assembly nonconcentrically surrounded by the outer sleeve and non-pivotably coupled to a frame of the vehicle platform, and (iii) an elastomeric material bonded to both the outer sleeve and the inner sleeve assembly, molded to partly fill a gap therebetween, and at least partly deformable to absorb a torque applied thereto by the outer sleeve.

In some embodiments, the eccentric pivoting can be effective to constrain the negatively vertical displacement of the roll center such that the roll center is disposed above-ground for at least a portion of the pivoting. In some such embodiments, the roll center can be disposed above-ground for all of the pivoting. In some such embodiments, the roll center can be disposed above a lower surface of the vehicle platform for at least a portion of the pivoting.

In some embodiments, each of the bushings installed in the openings of the inboard portions can be oriented such that a maximum radial thickness of the partly filled gap is disposed outboardward of the inner sleeve assembly and the minimum radial thickness of the partly filled gap is disposed inboardward of the inner sleeve assembly.

According to embodiments of the present disclosure, a vehicle platform comprises: first and second vehicle corner modules (VCMs) mounted on opposite sides of the vehicle platform, and comprising respective suspension assemblies, each of the respective suspension assemblies comprising a control arm, the control arm including two inboard portions, each inboard portion including an eccentric bushing installed in an opening therein, each of the two bushings of the control arm being oriented such that for each bushing, a central longitudinal axis of the bushing is disposed inboardward of a parallel, central axis of the respective opening, wherein, when an at least partly vertical force is received by an outboard portion of the respective control arm of a single suspension assembly to pivot the control arm about the respective bushings, (i) the control arm of the single suspension assembly is constrained to pivot eccentrically about respective virtual pivot axes that are displaced inboardward from the central axes of inner sleeve assemblies of the two bushings installed in the inboard-portion openings of the control arm, and (ii) the eccentric pivoting of the control arm about the respective virtual pivot axes extends an effective length of the control arm, and is effective to constrain an outboardward displacement of a roll center of the vehicle platform.

In some embodiments, each of the eccentric bushings can comprise (i) an annular outer sleeve seated in the respective opening, (ii) an inner sleeve assembly nonconcentrically surrounded by the outer sleeve and non-pivotably coupled to a frame of the vehicle platform, and (iii) an elastomeric material bonded to both the outer sleeve and the inner sleeve assembly, molded to partly fill a gap therebetween, and at least partly deformable to absorb a torque applied thereto by the outer sleeve.

In some embodiments, each of the bushings installed in the openings of the inboard portions can be oriented such that a maximum radial thickness of the partly filled gap is disposed outboardward of the inner sleeve assembly and the minimum radial thickness of the partly filled gap is disposed inboardward of the inner sleeve assembly.

BRIEF DESCRIPTION OF THE DRAWINGS

The invention will now be described further, by way of example, with reference to the accompanying drawings, in which the dimensions of components and features shown in the figures are chosen for convenience and clarity of presentation and not necessarily to scale. In the drawings:

FIGS. 1A and 1B are schematic end views of an eccentric bushing according to embodiments of the present invention.

FIGS. 1C, 1D, and 1E are, respectively, schematic side, top, and perspective views of an eccentric bushing according to embodiments of the present invention.

FIG. 9A illustrates certain structural and functional aspects of a control arm fitted with eccentric bushings, according to embodiments of the present invention.

FIG. 9B shows a block diagram of a vehicle corner module (VCM) comprising a suspension system that includes a control arm fitted with eccentric bushings, according to embodiments of the present invention.

FIG. 9C shows a block diagram of a vehicle comprising VCMs as per FIG. 9B.

FIGS. 14A and 15B illustrate vertical migration of instantaneous roll center using eccentric upper control arm bushings, according to embodiments of the present invention.

DETAILED DESCRIPTION OF THE ILLUSTRATED EMBODIMENTS

Figure 2A:
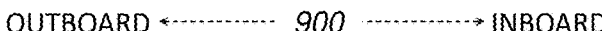
FIGS. 2A and 2B are schematic views of a control arm, respectively with and without eccentric bushings seated in inboard portions of the control arm, according to embodiments of the present invention.
Figure 2A:
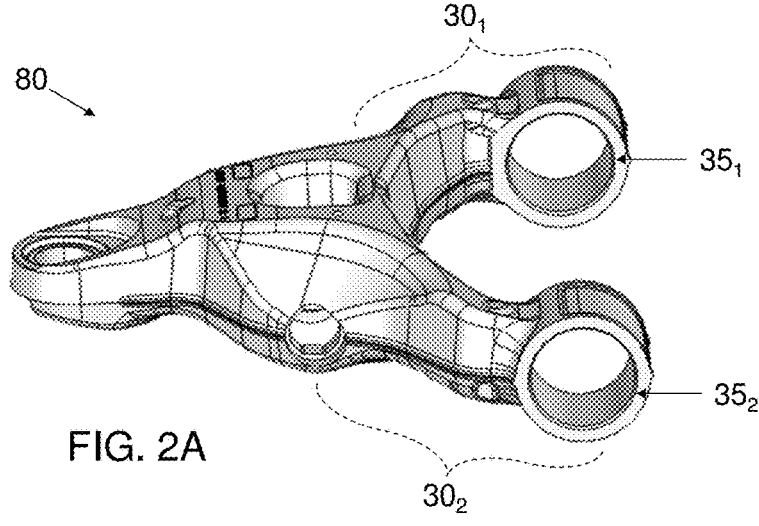

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. Throughout the drawings, like-referenced characters are generally used to designate like elements.

In this disclosure, subscripted reference numbers (e.g., $10_1$) may be used to designate multiple separate appearances of elements of a single species, whether in a drawing or not; for example: $10_1$ is a single appearance (out of a plurality of appearances) of element 10. The same elements can alternatively be referred to without subscript (e.g., 10 and not $10_1$) when not referring to a specific one of the multiple separate appearances, or the species in general. When the letters 'L' and 'U' are used in subscripts, they refer to lower and upper elements, respectively. When 'RF', 'LF', 'RR' and 'LR' are used in subscripts, they refer to right-front, left-front, right-rear, and left-rear, respectively.

For convenience, in the context of the description herein, various terms are presented here. To the extent that definitions are provided, explicitly or implicitly, here or elsewhere in this application, such definitions are understood to be consistent with the usage of the defined terms by those of skill in the pertinent art(s). Furthermore, such definitions are to be construed in the broadest possible sense consistent with such usage.

Embodiments of the present invention can relate to vehicles, vehicle platforms, vehicle corner modules (VCMs) for vehicles, suspension systems for vehicles, i.e., for VCMs that are intended to be used on vehicle platforms and in vehicles, control arms for said suspension systems, and control-arm bushings for control arms of suspension systems. Non-limiting examples of a vehicle, according to this definition, are a vehicle with motive power provided by an onboard engine, and an 'electric vehicle' powered, when in motion, by one or more electric motors and a battery (or other energy storage device) onboard. The word 'vehicle' should also be understood as encompassing a "vehicle platform" comprising at least a chassis (or other 'reference frame' to which vehicle corner modules can be mounted) and wheels. A 'vehicle platform' need not necessarily comprise, at the time of providing the vehicle platform, any or all of the accoutrements required for transport of passengers and/or cargo such as vehicle-body components or interior furnishings. In some embodiments, a vehicle and a vehicle platform can be the same.

The term 'vehicle corner module' or, equivalently, 'VCM', is used to describe assemblies of steering components and/or drivetrain components and/or suspension components. The mounting of a VCM to a vehicle platform can be done as a unit, but it is not necessarily so, and some components of the VCM may be added onto a VCM that is already 'mounted' to the vehicle platform. A VCM may include a 'sub-frame' to which some or all of the assembly components are mounted or otherwise attached such that the sub-frame mediates between the reference frame and the various assembly components. The term 'sub-frame' can be understood to mean any rigid frame or one or more structural elements in fixed combination. The 'sub' prefix is intended to distinguish the sub-frame from a main frame or reference frame of the vehicle. A VCM or may not include an electric motor and/or the wheel itself and/or a tire.

As the term is generally used, a 'suspension system' is a largely mechanical system for controlling the motion of a vehicle (or vehicle platform) with respect to the ground. In some embodiments of the present disclosure, the term is used to mean a suspension sub-system of a VCM, where the VCM can also include, in addition to the suspension system, one or more of a steering system, a braking system, and a drivetrain system, any of which can be present as sub-systems of a VCM. In an illustrative example, a vehicle comprising four VCMs according to the embodiments disclosed herein includes four respective suspension systems according to embodiments, i.e., one in each VCM, each respective suspension system being provided to mediate between a respective sub-frame of the VCM and a respective wheel. In some embodiments, the term is mean to use a suspension system of a vehicle that is not based on the VCM architecture, or which uses VCMs for one or more wheels, e.g., in opposing pairs, but not for all wheels.

A suspension system typically includes one or more telescopic dampers and biasing elements such as coil springs, as well as other components, all of which are beyond the scope of the present disclosure, and any suspension system components can be combined with any of the control arms and control-arm bushings of the present disclosure so as to be within the respective scope(s) of any of the respective embodiments.

In some embodiments, a suspension system includes an electronics array that includes at least one electronic device such as a controller or sensor. The term 'controller' as used herein can refer to the electronics array or to any component (or combination of components) of the electronics array. An electronics array can include any combination of hardware, firmware and software, including, without limitation, processors, computer storage and stored program instructions. An electronics array can also include, without limitation, sensors and wired and/or wireless communications devices. An electronics array can be provided to as part of, or together with, the suspension system so as to be at least partly dedicated to the control and operation of the suspension system, or it can be shared amongst various sub-systems of the VCM, e.g., in a wheel-assembly control module, or it can be installed on the vehicle platform, e.g., in a vehicle control module. In some embodiments, a single electronics array installed on the vehicle platform can include one or more controllers that jointly control multiple, or even all, suspension systems mounted to the vehicle. In some embodiments, a suspension controller is configured, in terms of hardware, firmware, and/or software, to coordinate suspension control functions in combination with one or more suspension controllers of other VCMs, and/or with a vehicle controller. Any such electronics array or controller can be combined with in any embodiments of suspension systems, control arms and control-arm bushings disclosed herein so as to be within the respective scope(s) of any of the respective embodiments.

We now refer to the figures, and in particular to FIGS. 1A, 1B, 1C, 1D and 1E. A non-limiting example of an eccentric control-arm bushing according to embodiments of the present disclosure is illustrated schematically in a number of views and orientations.

FIGS. 1A and 1B show an end view of an exemplary eccentric bushing 50. The bushing 50 includes an outer cylinder sleeve 55 sized to be seated in an opening of a control arm, and an inner sleeve assembly 51 which includes a connection member 53 for bolting to a vehicle frame. The inner sleeve assembly 51 can include a separate sleeve around the connection member 53, as shown in FIGS. 1A-B, or it can be formed so that there is not a separate sleeve around the connection member 53. The inner sleeve assembly 51 is installed off-center in the outer sleeve 55, i.e., the outer sleeve 55 and inner sleeve assembly 51 are not aligned concentrically, and hence the nomenclature 'eccentric bushing'.

The volume between the outer sleeve 55 and the inner sleeve assembly 51 is partly filled by an elastomeric material 56 that is bonded to the inner surface of the outer sleeve 55 and the outer surface of the inner sleeve assembly 51. In an example, the elastomeric material 56, which can comprise a rubber or any polymer with properties similar to rubber (viscoelasticity, low Young's modulus, etc.), is molded into the gap and optionally cured therewithin. The elastomeric material 56 is molded to surround voids 59 in the material which are designed to enhance various performance attributes of the bushing. For example, when the inner sleeve assembly 51 has a fixed orientation (relative to a vehicle frame) because it is non-pivotably connected to the vehicle frame and the outer sleeve 55 is pivoted by a force acting on the opposite end of the control arm (e.g., a bump at the wheel or rebound of the suspension system), the voids 59 contribute to the tendency of the elastomeric material 56 to deform and partly absorb the torque applied to the elastomeric material 56 by the outer sleeve 55. The specific shape, size, position and number of the voids 59 is a question of optimization for ride comfort and stability, and such an optimization can be performed for specific vehicle parameters and desired ride characteristics. The bushing design of FIG. 1A is repeated throughout the attached figures for purposes of convenience but should not be understood as a limiting the range of possible bushing designs. In the exemplary design of FIG. 1A, the 'outboard' portion (on the right side in FIG. 1A) includes a thicker section of elastomeric material 56, e.g., for greater compliance, and the 'inboard' portion (on the left side) includes a thinner section of elastomeric material 56, e.g., for greater stiffness. The voids 59 are shown as mirror-image voids 59 on either side of a horizontal axis (not shown) so as to render the bushing symmetrical across that horizontal axis such that bushing reaction is similar in both bump and rebound movements. The design of FIG. 1A is a non-limiting example of a design that is particularly suitable for interchangeable use in any control arm—forward or trailing, left or right—as is discussed in greater detail hereinbelow.

The terms 'inboard' and 'outboard' and their derivatives, as used in the specification and in the appended claims and drawings, have the following meaning: 'outboard' is the direction away from the vehicle platform and towards the wheel; 'inboard' is the opposite direction, i.e., away from the wheel and towards the vehicle platform. For example, control-arm bushings 50, as shown, e.g., in FIGS. 2B and 3, are installed in the 'inboard' portions of control arms because that is the end of the control arm that is directly connected to a frame of the vehicle. The opposite end of the control arm, which is often attached to an upright or steering knuckle, etc., of a wheel hub, is described herein as belonging to the 'outboard' portion of the control arm.

FIG. 1B shows an eccentric bushing 50 similar to that of FIG. 1A, with the inner sleeve assembly 51 rotated to an angle selected to match a specific vehicle frame member. The inner sleeve assembly 51 is rotated from the orientation shown in FIG. 1A, but the bushing 50 is not, such that the inboard-outboard orientation and vertical symmetry of the elastomeric material 56 and voids 59 are maintained.

FIGS. 1C, 1D, and 1E are respective side, top, and perspective views of the eccentric bushing 50 of FIG. 1A. As shown in FIGS. 1C and 1E, the connection member 53 includes a connection volume 54 so that the connection member 53 can be used to make a bolted connection to the frame of a vehicle platform or any other frame.

Figure 2B:
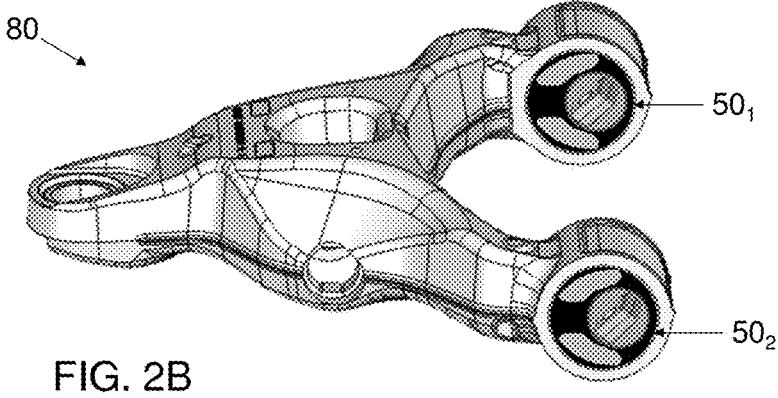
Figure 3:
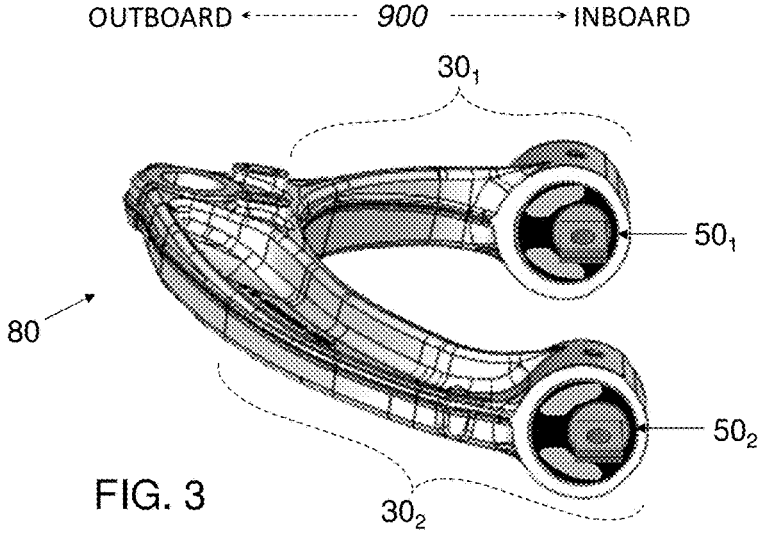
FIG. 3 is a schematic view of a control arm with eccentric bushings seated in inboard portions of the control arm, according to embodiments of the present invention.
Figure 4:
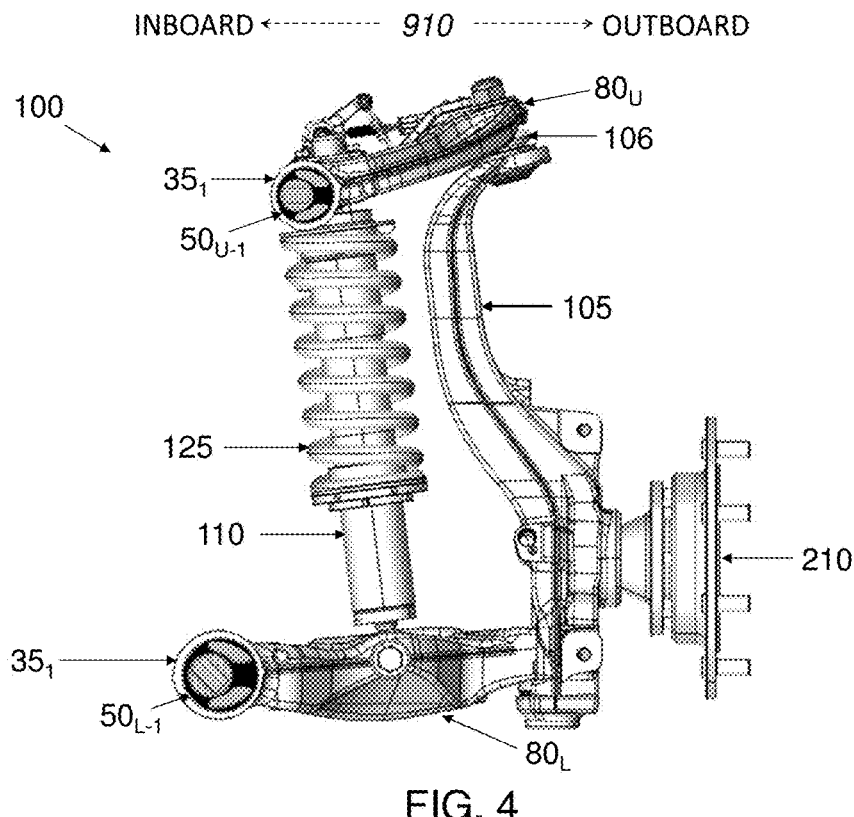
FIGS. 4 and 5 are schematic side views of a suspension system showing eccentric bushings installed in both lower and upper control arms.
Figure 5:
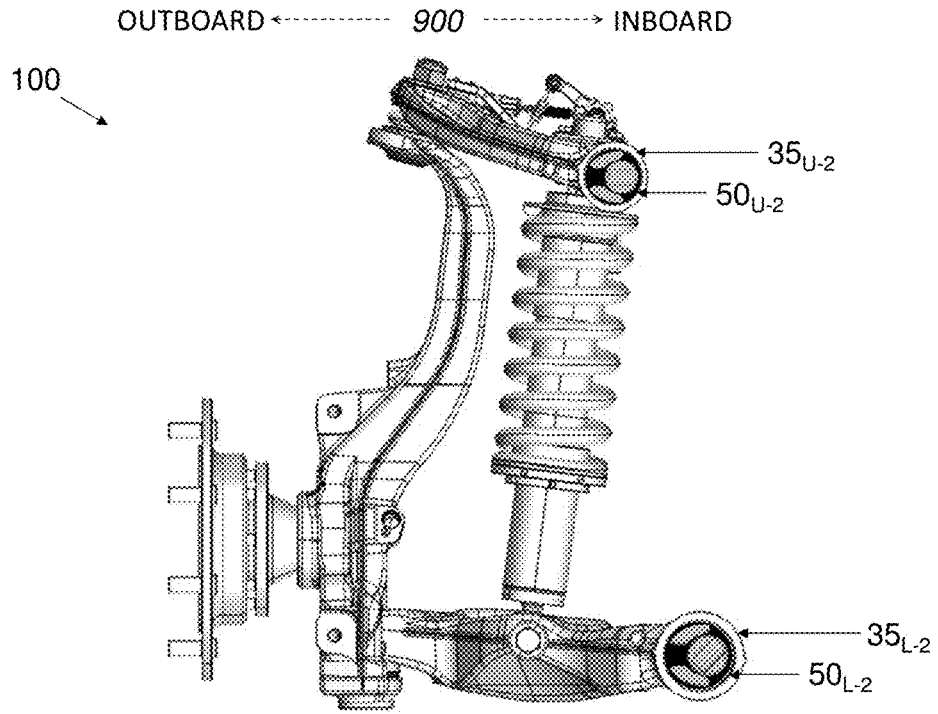

Referring now to FIGS. 2A and 2B, respective inboard and outboard directions for intended use of the control arm 80 in a suspension system are indicated by arrow 900. A control arm 80 is illustrated with a traditional 'horseshoe' shape having two parallel inboard portions $30_1$, $30_2$. Each inboard portion 30 includes a respective opening 35 in which a bushing can be installed. FIG. 2B shows the two bushings $50_1$, $50_2$, installed, respectively, in the two inboard portions $30_1$, $30_2$. The eccentric bushings 50 of FIG. 2B are similar to that of FIG. 1B in which the inner sleeve assembly 51 is rotated from the horizontal in accordance with the orientation of the frame member to which this particular control arm 80 is intended to be connected to.

FIG. 3 shows another control arm 80. In contrast to the control arm of FIG. 2B, the control arm 80 of FIG. 3 employs the eccentric bushing 50 according to FIG. 1A, i.e., the inner sleeve assembly 51 and its connection member 53 are oriented in a horizontal position.

Figure 6A:
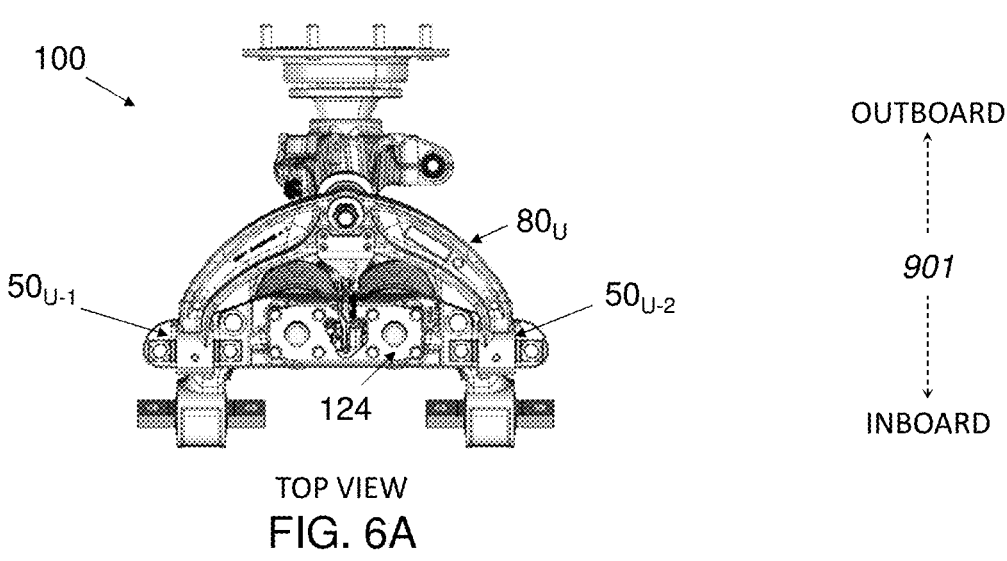
FIGS. 6A and 6B are, respectively, schematic top and bottom views of a suspension system showing eccentric bushings installed in both lower and upper control arms.
Figure 6B:
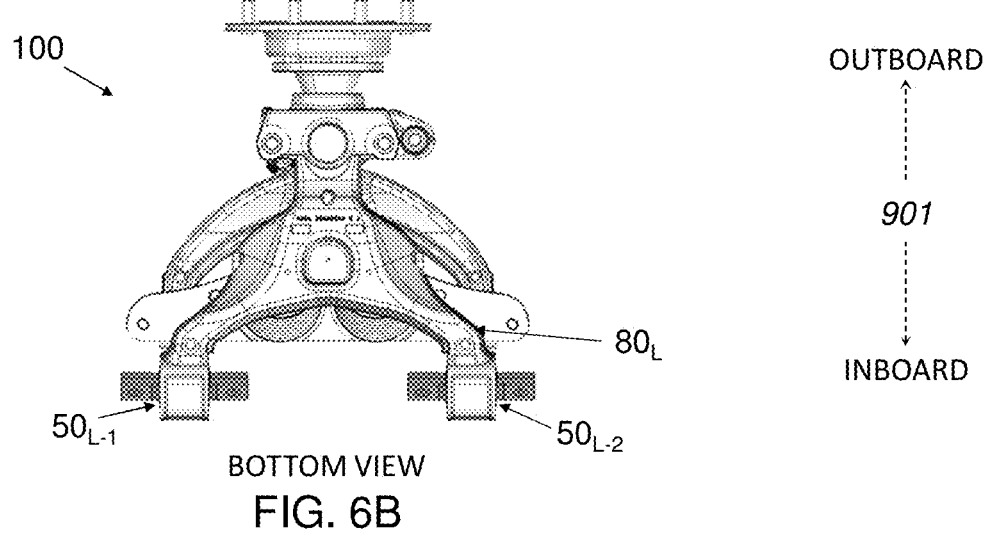

Referring now to FIGS. 4, 5, 6A and 6B, a suspension system 100 includes control arms $80_U$ (in an example, the control arm previously shown in FIG. 3) and $80_L$ (in an example, the control arm previously shown in FIG. 2B) having eccentric bushings 50 seated in respective openings 35 of the inboard portions 30 of the two control arms $80_U$, $80_L$. Inboard and outboard directions are specific to each figure, as indicated by respective arrows 910, 900, 901. FIGS. 6A and 6B show respective top and bottom views of the suspension system of FIGS. 4-5, both views being shown in the same direction of travel, which is indicated by arrow 930. It can be understood from FIGS. 6A and 6B that given a direction of travel 930, the upper bushings $50_{U-1}$, $50_{U-2}$ are interchangeable with each other, as are lower bushings $50_{L-1}$, $50_{L-2}$.

In some configurations, a suspension system employs eccentric bushings of the type disclosed herein in both upper and lower control arms. This may require larger bushings in the lower control arms than in the upper control arms, due, inter alia, to the different magnitude of the forces acting upon the respective control arms. In some configurations, the suspension system employs the eccentric bushings only in the upper control arm, while the lower control arms are equipped with conventional concentric bushings. In a third type of configuration, the suspension system employs the eccentric bushings only in the lower control arm, while the upper control arms are equipped with conventional concentric bushings. Regardless of how the embodiments are illustrated in specific figures, any of these configurations can be applicable, depending on design requirements.

Figure 7:
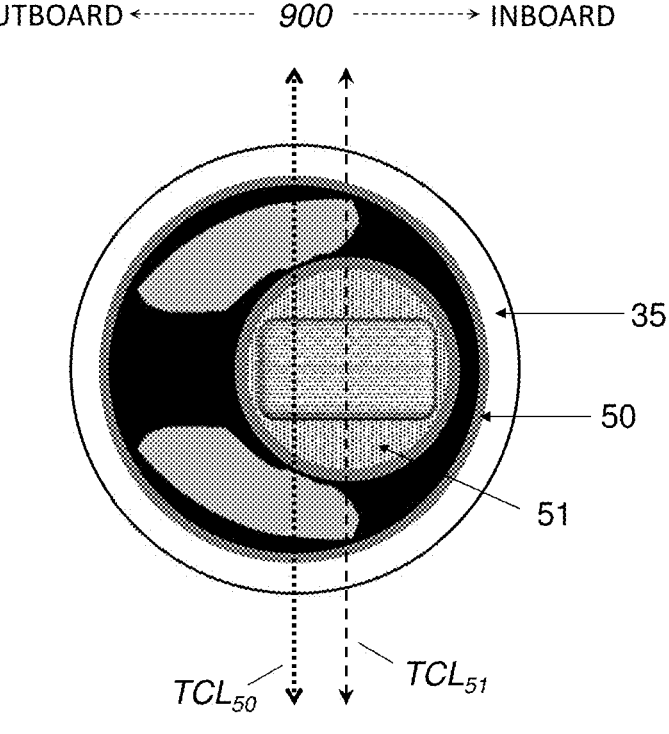
FIG. 7 is a schematic end view of an eccentric bushing seated in the inboard opening of a control arm, illustrating respective transverse axes, according to embodiments of the present invention.
Figure 8:
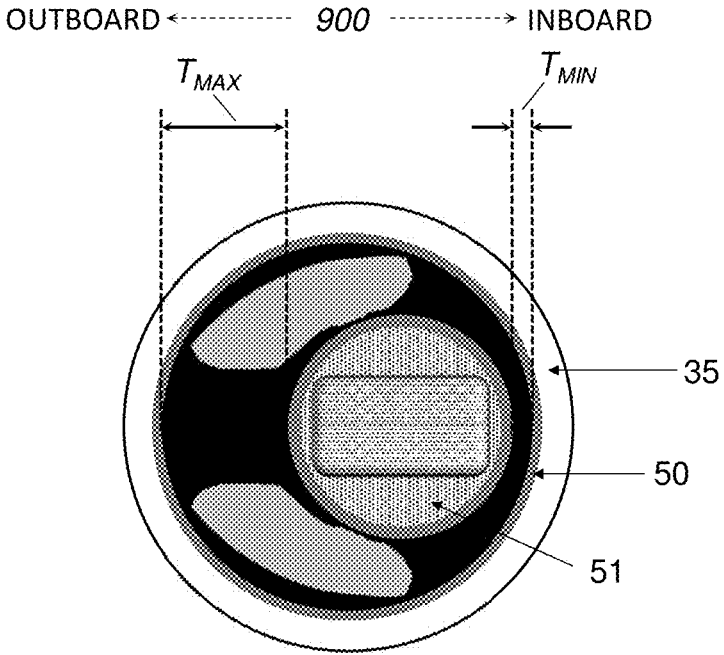
FIG. 8 a schematic end view of an eccentric bushing seated in the inboard opening of a control arm, illustrating respective maximum and minimum dimensions of an elastomeric material of the bushing, according to embodiments of the present invention.

Certain design parameters of eccentric bushings are illustrated in FIGS. 7 and 8. FIG. 7 shows a transverse centerline $TCL_{50}$ of the eccentric bushing 50, and a transverse centerline $TCL_{51}$ of the inner sleeve assembly 51 of the eccentric bushing 50. The term 'transverse' is used to differentiate from 'longitudinal' centerlines which are in the end-to-end direction of the bushing, i.e., through one connection member and out through the other connection member, as shown in FIG. 9A in the case of longitudinal centerline (of the inner sleeve assemblies 51 of the bushings 50) $LCL_{51}$.

With reference to arrow 900 showing respective inboard and outboard directions in expected use and orientation of the bushing 50, the transverse centerline $TCL_{51}$ of the inner sleeve assembly 51 is inboardward of transverse centerline $TCL_{50}$ of the eccentric bushing 50.

As is known in the art, the dimensions of conventional bushings may vary from vehicle to vehicle, between upper and lower control arm bushings in the same vehicle, and even between leading and trailing bushings in the same control arm. Dimensions of eccentric bushings 50 according to embodiments of the present disclosure can also vary from vehicle to vehicle, and between upper and lower control arm bushings in the same vehicle. In a non-limiting, illustrative example that will be referred to throughout the current disclosure, a selected eccentric upper control arm bushing 50 has an outer diameter of 68 mm. The outer sleeve 55 has a wall thickness of 2 mm, such that the inner diameter of the outer sleeve 55 is 64 mm. The outer diameter of the inner sleeve assembly 51 is 38 mm. The transverse centerline $TCL_{51}$ of the inner sleeve assembly 51 is displaced 8 mm inboardward from the transverse centerline $TCL_{50}$ of the eccentric bushing 50. Other dimensions of the exemplary bushing 50 include: 150 mm total length from an end of one connection member 53 to the end of the second connection member 53. for bolting to a vehicle frame; 110 mm from the center of one connection volume 54 to the other; and a 60 mm length of the outer sleeve 55.

FIG. 8 illustrates that the maximum thickness $T_{MAX}$ of the gap partly filled with elastomeric material 56 is disposed outboardward of the inner sleeve assembly 51, and the minimum radial thickness $T_{MIN}$ of the partly filled gap is disposed inboardward of the inner sleeve assembly 51. The maximum thickness $T_{MAX}$ can be at least twice the minimum thickness $T_{MIN}$, or at least three times the minimum radial thickness $T_{MIN}$, or at least four times the minimum radial thickness $T_{MIN}$, or at least 5 times the minimum radial thickness $T_{MIN}$. In the non-limiting illustrative example above in which the upper control arm bushing 50 has an outer diameter of 68 mm and an inner sleeve assembly outer diameter of 38 mm, the minimum radial thickness $T_{MIN}$ of the elastomeric material 56 is about 5 mm and the maximum radial thickness $T_{MAX}$ is about 21 mm.

FIG. 9A shows further aspects of a control-arm system comprising a control arm 80 and two substantially identical eccentric bushings $50_1$, $50_1$ in openings 35 (not shown in FIGS. 9A-9B) of respective inboard portions $30_1$, $30_2$. According to some embodiments, eccentric bushings 50 are interchangeable between leading and trailing positions. As is known in the art, conventional, i.e., concentric, bushings are often selected in accordance with mechanical parameters such as stiffness or compliance (the inverse of stiffness). High stiffness means that more force can be applied with minimal displacement, and in the context of a bushing results in a harder ride but more precise handling. Thus, a bushing characterized by higher stiffness is selected for use as a leading bushing, i.e., in the opening of the control arm that is more forward in the direction of travel. A bushing characterized as being more compliant is selected for use as a trailing bushing to provide better isolation from the road. The eccentric bushing 50 of the present disclosure provides the desired mechanical characteristics of either the leading or trailing bushing. FIG. 9A shows, in simple schematic form, the forces present in a control arm during travel in the direction indicated by arrow 930 when a force, indicated by arrow 801, is applied, e.g., by the wheel 210, e.g., in a bump or rebound phase, on the outboard portion of the control arm 80. As indicated by arrow 800, the leading bushing $50_1$ of FIG. 9A is under tension, and therefore stiffer, so as to better control geometry and control-arm pivot. As indicated by arrow 802, the outboard portion of the trailing bushing $50_2$ is under compressive force, which is at least in part absorbed by the thicker elastomeric material 56 which has its maximum thickness $T_{MAX}$ placed outboardward, between the control arm 80 and the vehicle platform, so as to make the trailing bushing more compliant. The performance of the eccentric bushings $50_1$, $50_2$ thus emulates the performance of two bushings of differentiated design for leading and trailing positions, but with interchangeable bushings of identical design.

The diagram of FIG. 9B illustrates a vehicle control module (VCM) 150 which comprises a suspension system 100 that includes the control arm 80 of FIG. 9A, including the eccentric bushings $50_1$, $50_2$ as discussed hereinabove. The control arm 80 fitted with eccentric bushings can function as an upper control arm, a lower control arm, or both upper and lower control arms, depending on the requirements of the specific vehicle. In embodiments, a vehicle or vehicle platform includes a plurality of VCMs 150 according to FIG. 9B. In some embodiments, the plurality of VCMs 150 includes one or more opposing pairs of such VCMs 150. FIG. 9C illustrates a non-limiting example of a vehicle platform 250) having two opposing pairs of VCMs 150 according to FIG. 9B mounted thereupon. It is possible to understand from FIG. 9C that use of the interchangeable eccentric bushings 50 allow both the suspension system 100 and VCM 150 to be installed on either side of the vehicle platform 250 simply by rotating the suspension system 100 or VCM 150 180° on a horizontal plane. Thus, in addition to the improved performance characteristics of the eccentric bushings as disclosed herein, the use of the eccentric bushings can greatly simplify assembly, maintenance and inventory management processes by reducing the number of parts and subassemblies used by any given vehicle model.

A longer control arm can be generally more desirable than a shorter control arm for enabling greater ride stability and comfort, including controlling roll and the reducing the migration of the instant roll center of the vehicle, e.g., in a bump or rebound phase. However, the modern vehicle design does not always allow enough room for a longer control arm, and the drawbacks of shorter control arms have to be overcome in other ways. In embodiments, use of the eccentric bushings disclosed herein can help to overcome the drawbacks of shorter control arms by virtually moving the inboard pivot point of the control arm further inboardward, even further inboardward than the bushing itself in some embodiments, and thus extend the effective length of the control arm for purposes of maintaining ride stability and limiting roll center migration. In some designs, the benefit of the effective length extension can be particularly valuable in the case of the upper control arms, because they are disposed at a height where more room can be needed for passenger and/or cargo space, while the lower control arms may be at a lower height where passenger and/or cargo space is less of a concern. The teachings of this disclosure with respect to deployment of eccentric bushings are applicable to other suspension designs, including in designs where instead of a double wishbone (two control arms each having two inboard portions and two bushings) a single control replaces one or even both wishbones.

Figures 10A, 10B, 10C:
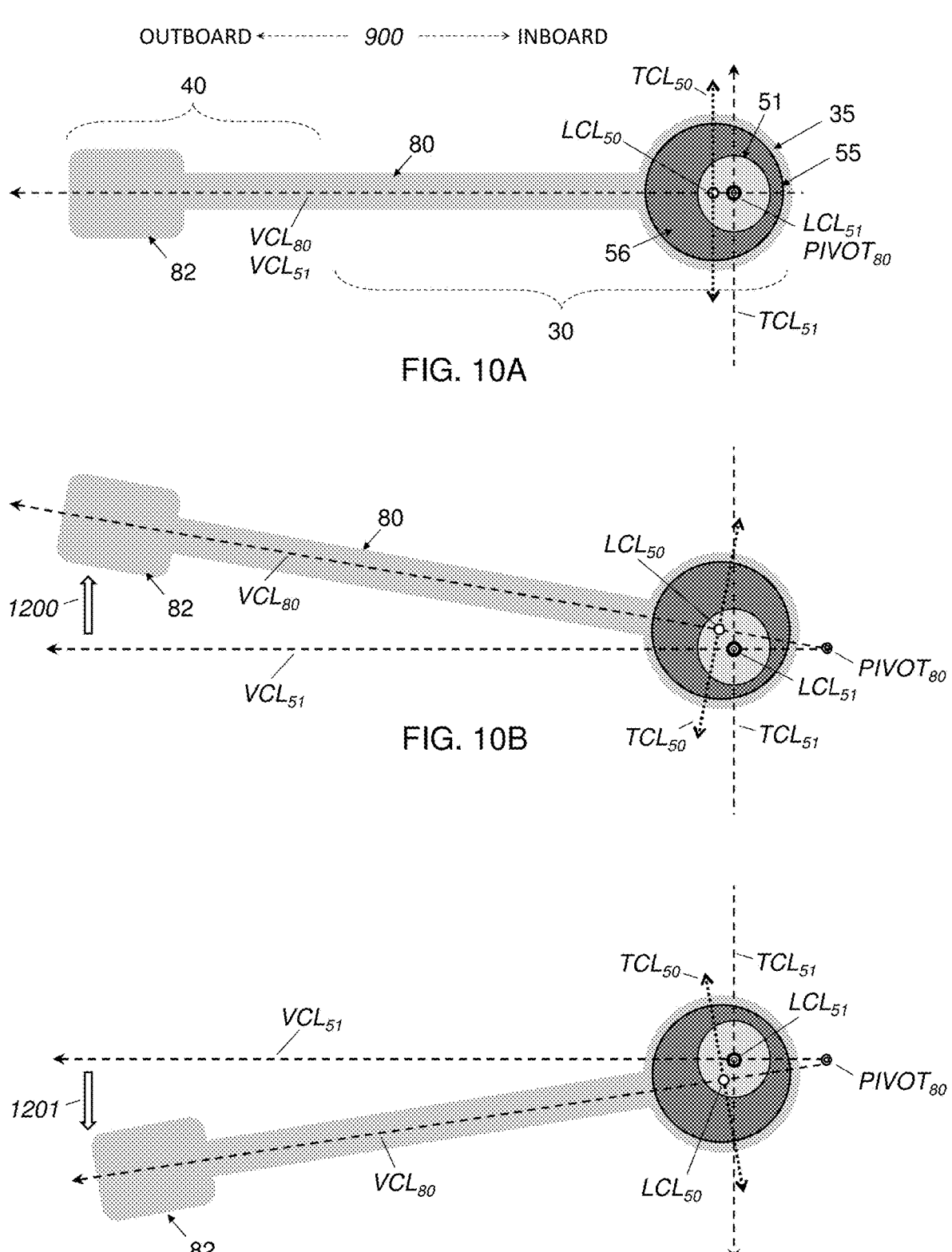
FIGS. 10A, 10B, and 10C schematically illustrate the pivoting of a control arm about an eccentric bushing, and the resultant displacement of a virtual pivot, according to embodiments of the present invention.

We now refer to FIGS. 10A, 10B and 10C. A stylized representation of a control arm is 80 fitted with an eccentric bushing 50 according to embodiments. The gaps 59 formed in the elastomeric material 56 are not shown. Arrow 900 indicates the respective outboard and inboard directions. An outboard portion 40 of the control arm 80 includes an outboard connection member, e.g., for seating a ball joint therewithin. An initial longitudinal centerline of the control arm 80 is indicated by 'vertical centerline' $VCL_{80}$ of the control arm 80, which coincides with the vertical centerline $VCL_{51}$ of the inner sleeve assembly 51. The vertical centerline $VCL_{80}/VCL_{51}$ passes through the longitudinal centerline $LCL_{50}$ of the eccentric bushing 50 where it intersects with a transverse centerline $TCL_{50}$ of the eccentric bushing 50 (shown in FIG. 7). The vertical centerline $VCL_{80}/VCL_{51}$ also passes through longitudinal centerline $LCL_{51}$ of the inner sleeve assembly of the bushing 50 where it intersects a transverse centerline $TCL_{51}$ of the inner sleeve assembly 51 (also shown in FIG. 7). Although the non-limiting example of FIG. 10A shows a straight control arm, in the case of a curved control arm 80 the vertical centerline of interest is the one through the 'inboard-most' end of the inboard portion 30 where it meets the opening 35.

The control arm 80 is arranged so that the outboard end 82 moves vertically with the wheel 210 (not shown in FIGS. 10A-C) and causes the control arm 80 to pivot about an inboard pivot axis $PIVOT_{80}$. In the 'standard ride' conditions of FIG. 10A, the initial pivot axis $PIVOT_{80}$, i.e., in the absence of a pivoting force, is the longitudinal centerline $LCL_{51}$ of the inner sleeve assembly 51, where the control arm 80 is bolted to a frame of the vehicle. As illustrated in FIGS. 10B and 10C, the pivot axis $PIVOT_{80}$ migrates as soon as a pivoting force is applied, due to the eccentricity of the bushing 50. The skilled artisan will understand that when using conventional concentric control-arm bushings, the pivot axis $PIVOT_{80}$ is (a) co-located with the longitudinal centerline $LCL_{51}$ of the inner sleeve assembly 51 and also with the longitudinal centerline $LCL_{50}$ of the eccentric bushing 50, and (b) does not migrate when a pivoting force is applied.

FIG. 10B illustrates, in part, the effect on the mechanical system of FIG. 10A when a force indicated by arrow 1200 is applied to the outboard end 82 of the control arm 80 so as to pivot the control arm about its inboard pivot axis $PIVOT_{80}$. An example of a force 1200 is the force applied to the outboard end 82 of the control arm 80 due to upward movement of the wheel 210 e.g., from a bump. The longitudinal centerline $LCL_{51}$ of the inner sleeve assembly 51, where the control arm 80 is connected to the frame, does not displace relative to the frame, nor does the inner sleeve assembly 51; instead the rest of the mechanical system, pivots and/or displaces such that in FIG. 10B it only appears that the inner sleeve assembly 51 and its longitudinal centerline $LCL_{51}$ have displaced relative to the other components. The pivoting motion of the control arm 80 causes the opening 35 and the outer sleeve 55 of the bushing 50 to rotate, as evidenced by the rotation, in FIG. 10B, of the transverse centerline $TCL_{50}$ of the bushing 50. On the other hand, the transverse centerline $TCL_{51}$ of the inner sleeve assembly 51 does not rotate because the inner sleeve assembly 51 does not rotate. At least a part of the torque applied by the outer sleeve 55 to the elastomeric material 56 is absorbed by the deformation of the elastomeric material 56. The longitudinal centerline $LCL_{50}$ of the bushing displaces, relative to the longitudinal central $LCL_{51}$ of the inner sleeve assembly 51, in an arc-vertically (up in this case, i.e., in the same direction as the wheel) and outboardward.

The vertical centerline $VCL_{80}$ of the control arm 80 rotates with the control arm 80, while the vertical centerline $VCL_{51}$ of the inner sleeve assembly 51 remains in its original position, given that the inner sleeve assembly 51 does not displace or pivot. The intersection of the rotated vertical centerline $VCL_{80}$ of the control arm 80 intersects the unrotated vertical centerline $VCL_{51}$ of inner sleeve assembly 51 at the now-virtual pivot axis $PIVOT_{80}$ of the control arm 80, as the pivot axis $PIVOT_{80}$ has moved inboardward from its initial (FIG. 10A) position where the $LCL_{51}$ was the pivot axis. The pivot point $PIVOT_{80}$ displaces inboardward of the inner sleeve assembly 51 and, depending on system parameters and the magnitude of the force 1200, i.e., the displacement of the wheel, can displace inboardward of the entire bushing 50, as is illustrated in FIG. 10B. The inboardward displacement of the pivot point $PIVOT_{80}$ means that the effective length of the control arm is extended, giving a shorter control arm some or all of the stability and comfort advantages of a longer control arm.

FIG. 10C illustrates, in the same manner as FIG. 10B, the effect on the mechanical system of FIG. 10A when a force indicated by arrow 1201—a downward force instead of upward force 1200—is applied to the outboard end 82 of the control arm 80 so as to pivot the control arm about its inboard pivot axis $PIVOT_{80}$. Here, too, the longitudinal centerline $LCL_{50}$ of the bushing displaces, relative to the longitudinal central $LCL_{51}$ of the inner sleeve assembly 51, in an arc—vertically (down in this case, i.e., again in the same direction as the wheel) and outboardward. Here, also, the pivot point $PIVOT_{80}$ displaces inboardward of the inner sleeve assembly 51 and, depending on system parameters and the magnitude of the force 1201, i.e., the displacement of the wheel, can displace inboardward of the entire bushing 50, as is illustrated in FIG. 10C, and the inboardward displacement of the pivot point $PIVOT_{80}$ means that the effective length of the control arm is extended.

Figure 11A:
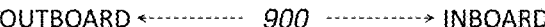
FIGS. 11A and 11B illustrate the dimensional change in pivot length of the control arm of FIGS. 10A-C when pivoted, according to embodiments of the present invention.
Figure 11A:
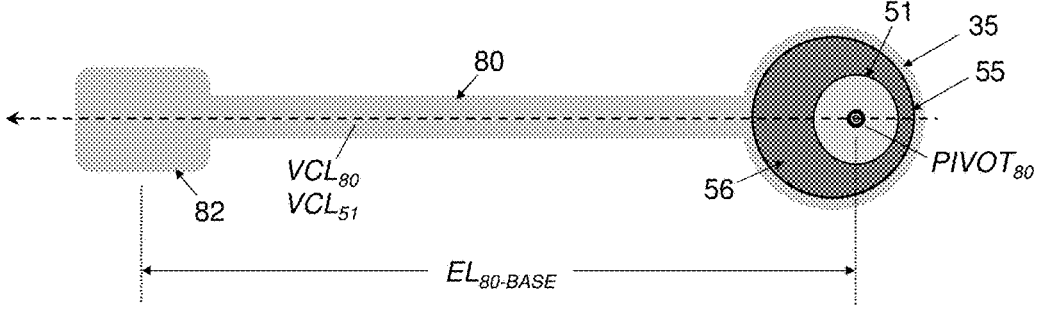
Figure 11B:
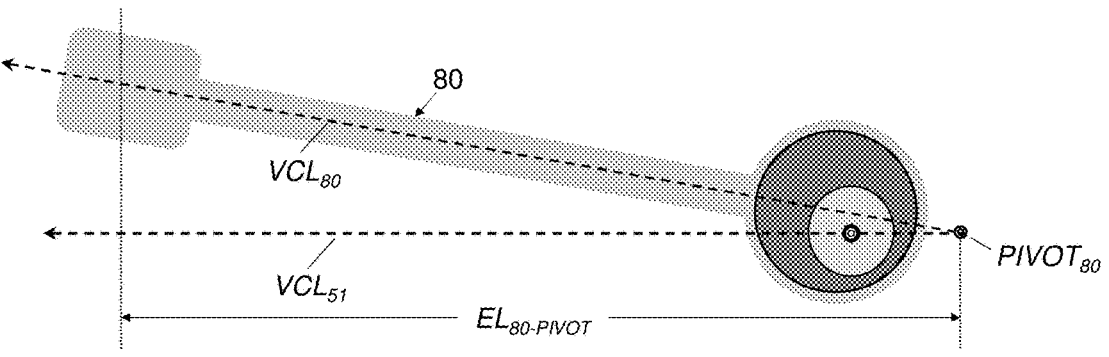

FIGS. 11A and 11B are effective to illustrate the increase in the effective length of the control arm 80 when pivoted by an outboard force 1200 or 1201. In the 'standard ride' based position shown in FIG. 11A (and 10A), the effective length $EL_{80-BASE}$ of the control arm 80 is measured from a point on the outboard end 82 of the control arm 80, e.g., the center of an outboard connection member for seating a ball joint therewithin, to the pivot axis $PIVOT_{80}$, which, as discussed earlier, is at the longitudinal centerline $LCL_{51}$ of the inner sleeve assembly 51. In the pivoted position of FIG. 11B (and 10B), the effective length $EL_{80-PIVOT}$ of the pivoted control arm 80 extends from the same point on the outboard end 82 of the control arm 80, to the virtual pivot point $PIVOT_{80}$, displaced inboardward from the longitudinal centerline $LCL_{51}$ of the inner sleeve assembly 51.

In an example, an upper control arm 80 using the exemplary bushing 50 of the non-limiting illustrative example above (i.e., outer diameter of 68 mm and an inner sleeve assembly outer diameter of 38 mm) has an effective unpivoted length $EL_{80-BASE}$ of 230 mm, and an effective length $EL_{80-PIVOT}$ at a maximum articulation of 267 mm. This 16% increase represents a 37 mm package benefit across the VCM or 74 mm in total for two opposing VCMs. In other examples, the increase in control arm articulation can be less than 16%, or greater than 16%, depending on bushing geometry, control arm length and design, and other factors.

Figure 12:
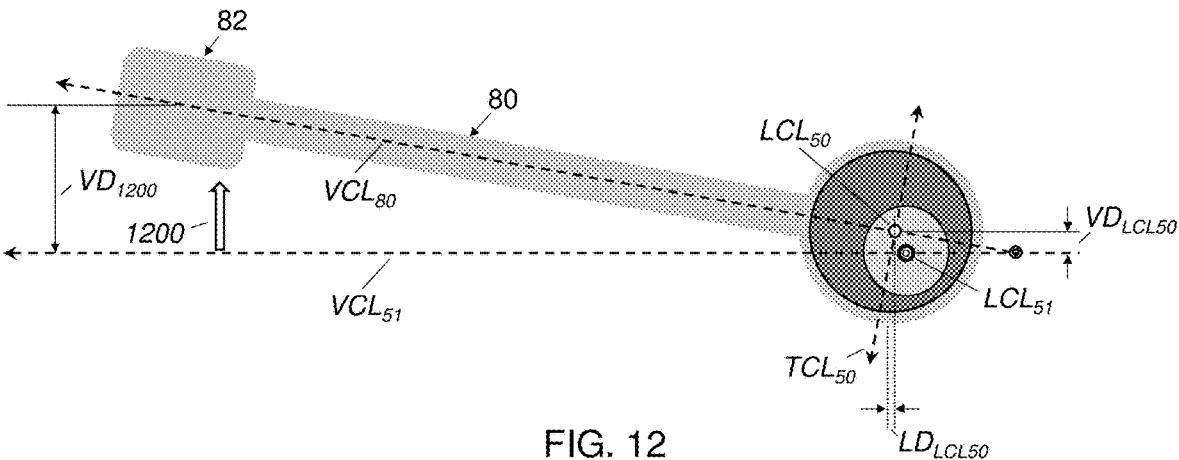
FIG. 12 illustrates, inter alia, the relative displacement of a longitudinal central axis of the inner sleeve of an eccentric bushing when the control arm is pivoted, according to embodiments of the present invention.

FIG. 12 illustrates additional parameters of the effects of the force indicated by arrow 1200 being applied to the outboard end 82 of the control arm 80 so as to pivot the control arm about its inboard pivot axis $PIVOT_{80}$, as shown in FIGS. 10B and 11B. The force 1200 causes a net vertical displacement $VD_{1200}$, i.e., the displacement is constrained or reduced, e.g., by absorption of torque in the elastomeric material 56 of the bushing 50. The corresponding vertical displacement of the longitudinal centerline $LCL_{50}$ of the eccentric bushing 50 is shown as $VD_{LCL50}$. The lateral inboardward displacement of the longitudinal centerline $LCL_{50}$ of the eccentric bushing 50 is shown as $LD_{LCL50}$. In embodiments, the vertical displacement $VD_{LCL50}$ of the of the longitudinal centerline $LCL_{50}$ is greater than the inboardward (lateral) displacement $LD_{LCL50}$. Returning again to the illustrative, non-limiting example of the control arm utilizing the eccentric bushing 50 having an outer diameter of 68 mm and an inner sleeve assembly outer diameter of 38 mm, and the control arm 80 having an effective unpivoted length $EL_{80-BASE}$ of 230 mm and an effective length $EL_{80-PIVOT}$ at a maximum articulation of 267 mm, for a net vertical displacement due to the force 1200 of 50 mm, the corresponding vertical displacement $VD_{LCL50}$ of the longitudinal centerline $LCL_{50}$ of the eccentric bushing 50 is 6 mm and the corresponding lateral inboardward displacement $LD_{LCL50}$ is roughly 2 mm.

We now refer to FIGS. 13A-B, 14A-B, and 15-16.

Figures 13A, 13B:
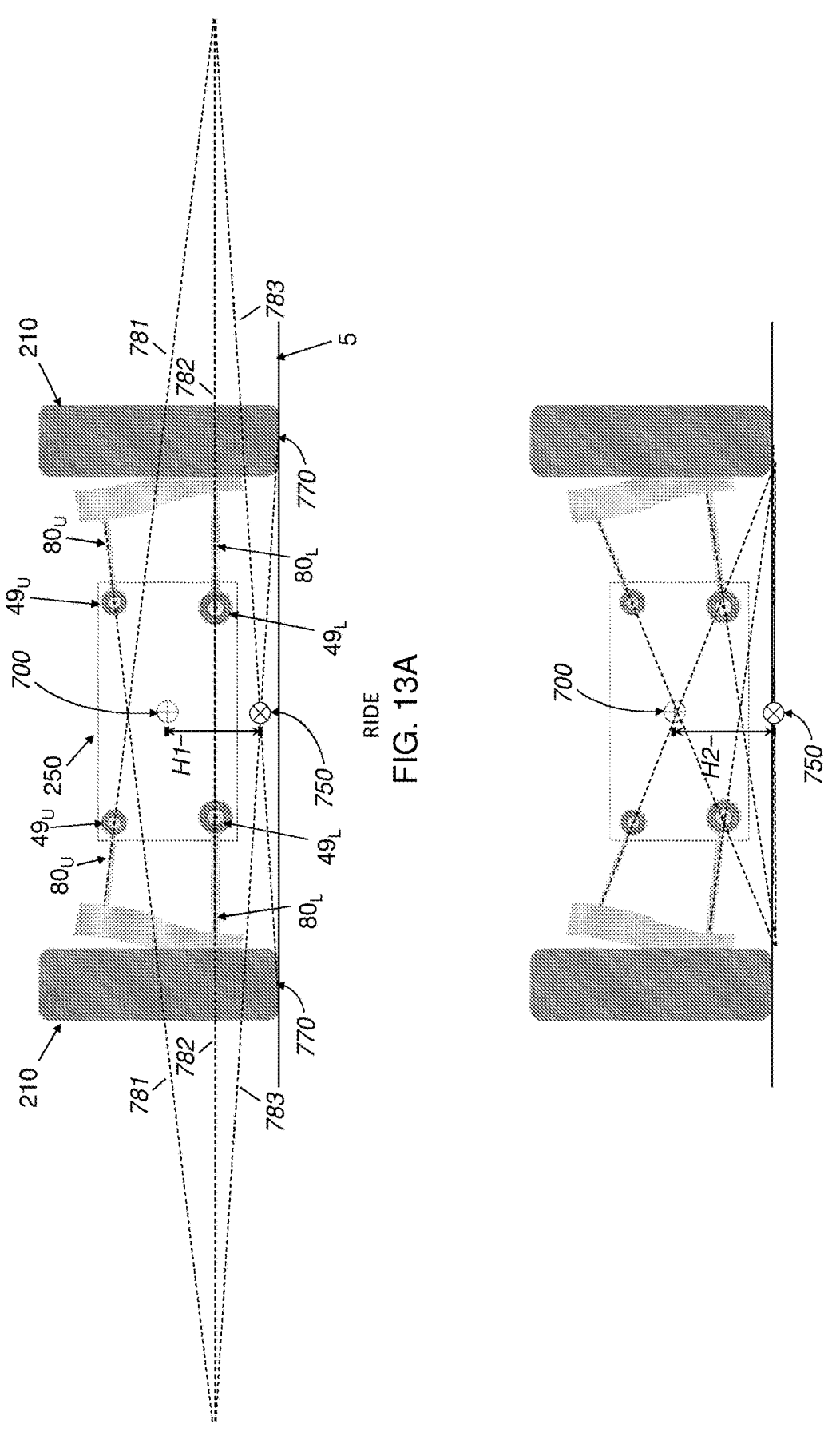
FIGS. 13A and 13B illustrate vertical migration of instantaneous roll center using conventional upper control arm bushings.
Figures 14A, 14B:
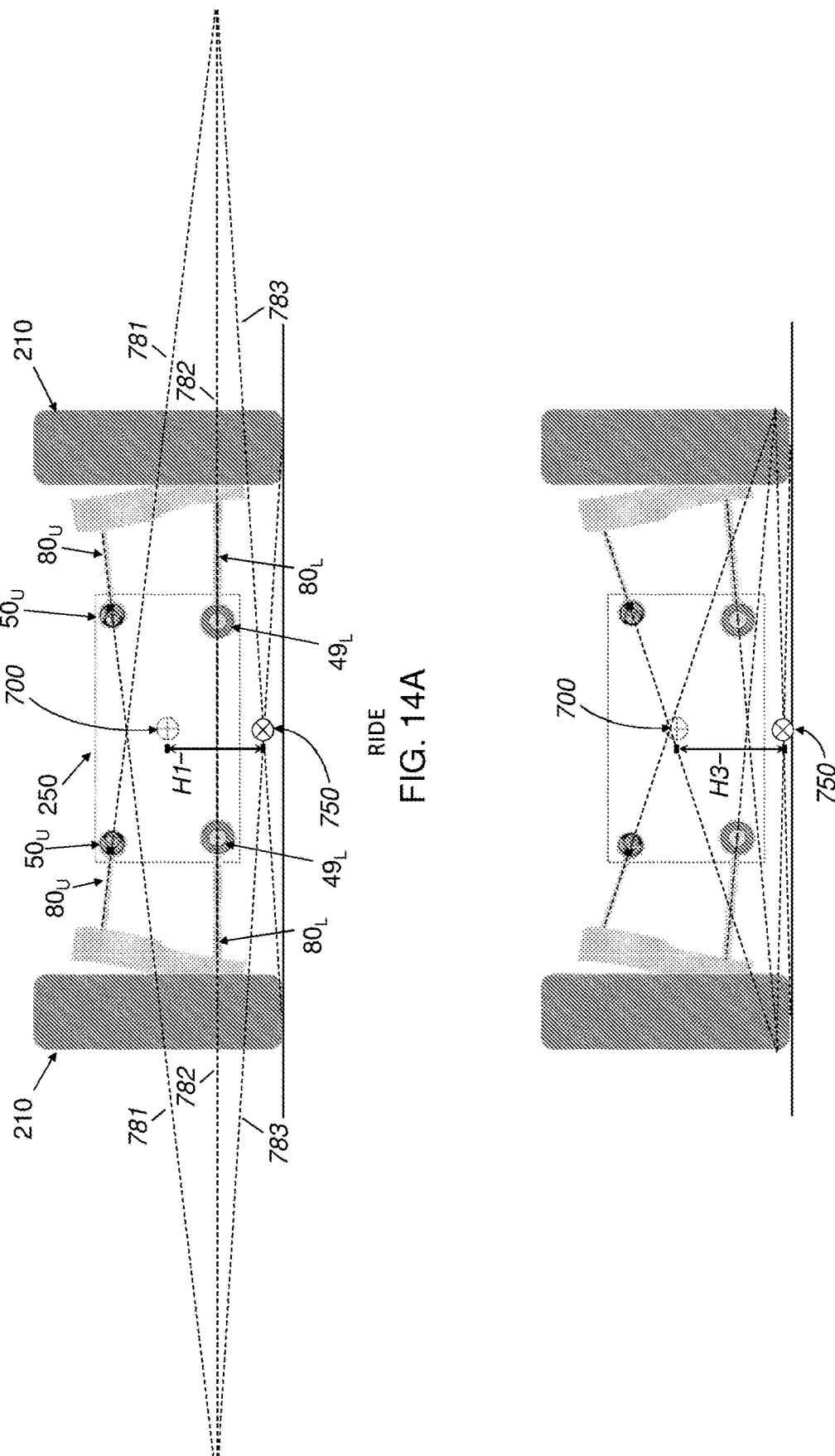
Figures 15, 16:
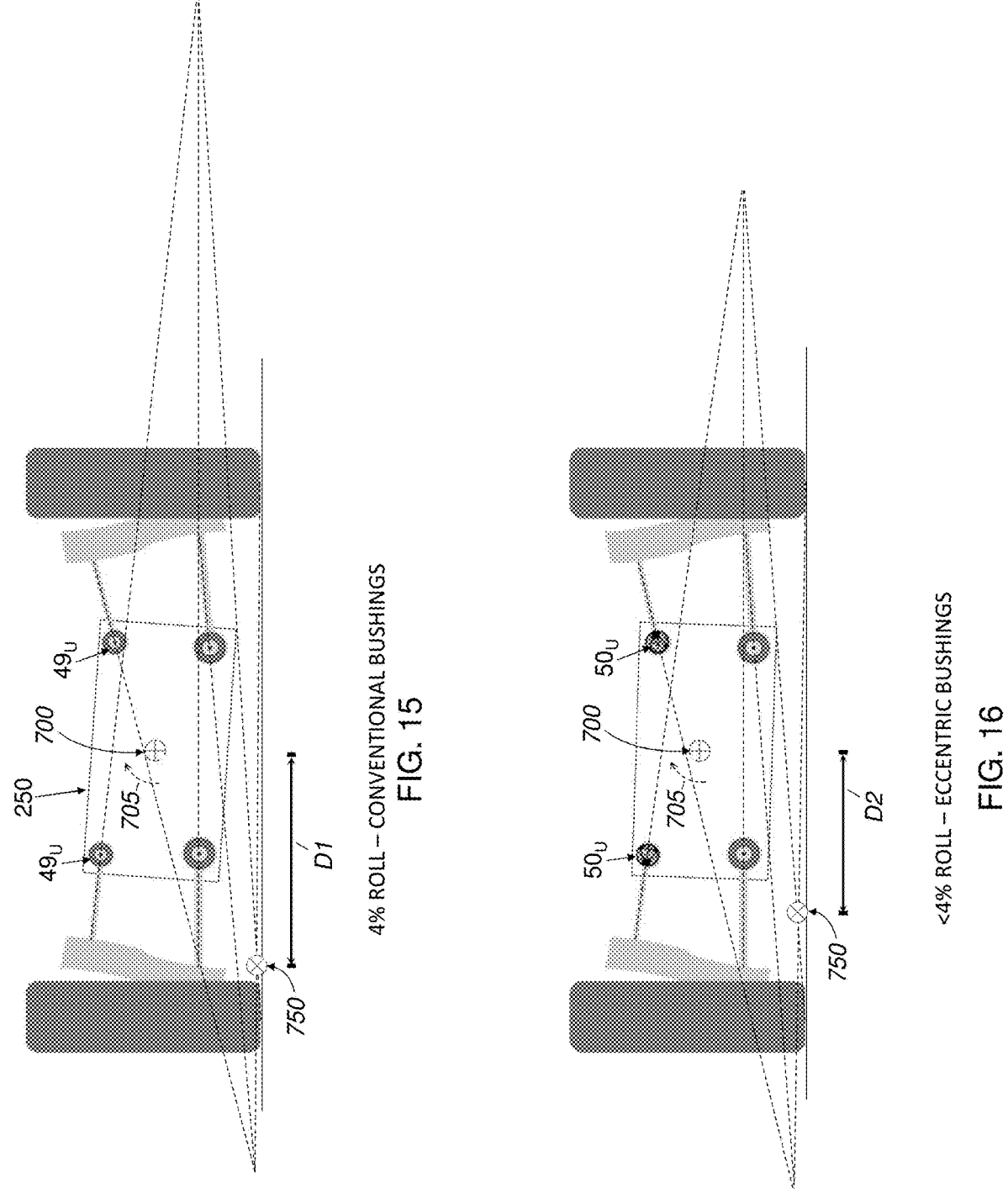
FIGS. 15 and 16 illustrate lateral migration of instantaneous roll center using conventional and eccentric upper control arm bushings, respectively, according to embodiments of the present invention.

In embodiments, deployment of eccentric bushings is effective to constrain displacement (also known in the industry as migration) of an instantaneous roll center of a vehicle platform in bump and/or rebound conditions, whether symmetrical (both wheels of an opposing pair) or one-sided. In some embodiments, the use of eccentric bushings which extend the effective pivot length of control arms are effective to constrain a negative vertical displacement of an instantaneous roll center, e.g., as illustrated in FIGS. 13B and 14B in the case of a symmetrical bump condition. In some embodiments, the use of eccentric bushings which extend the effective pivot length of control arms are effective to constrain an outboardward lateral displacement of an instantaneous roll center, e.g., as illustrated in FIGS. 15 and 16 in the case of a one-sided bump condition.

FIG. 13A shows a roll-center diagram in a standard 'ride' condition-since the illustration is schematic, it could represent either a front suspension or rear suspension. In some embodiments of the present disclosure, suspension systems are interchangeable right-left and front-rear, such that the diagram of FIG. 13A (as well as FIGS. 13B, 14A-B, 15 and 16) can apply equally to front or rear suspensions. All four control-arm bushings shown—upper control-arm bushings $49_U$ and lower control-arm bushings $49_L$—are conventional concentric bushings 49.

As is known, a simplified two-dimensional analysis can be used to determine an instantaneous roll center 750, including the following steps:

i. finding, for each side of a vehicle platform 250 having a center of gravity 700, the intersection of respective vectors equivalent to the vertical centerlines $VCL_{80}$ (shown, e.g., in FIGS. 11A-B) of the upper control arm $80_U$ and of the lower control arm $80_L$, said vectors being labeled 781 and 782, respectively, in FIG. 13A, and ii. determining, for each side of the vehicle platform 250, a vector 783 from the point 790 on a tire where the centerline of the wheel 210 meets the road 5 to the intersection of vectors 781 and 782 found in the previous step.

The instantaneous roll center 750 is located at the intersection of the two vectors 783 of the two respective sides of the vehicle platform 250.

FIG. 13B shows a roll-center diagram of the same vehicle of FIG. 13A, in a 'bump' condition during which the wheels 215 are, temporarily, relatively higher than the vehicle platform 250 than they are in the 'ride' condition. The instantaneous roll center 750 further displaces vertically (and negatively) from the center of gravity 700, and vertical displacement arrow H2 in FIG. 13B represents a greater than does vertical displacement arrow H1 in FIG. 13A. In the schematically drawn and non-limiting example of FIGS. 13A and 13B, the instantaneous roll center 750 is beneath the vehicle platform 150 but above ground/road 5 in the standard ride condition of FIG. 13A, and slightly below the surface of the road 5 in the bump condition of FIG. 13B. As is known, the greater vertical displacement between center of gravity 750 and instantaneous roll center 790 reduces the stability of the vehicle.

The diagram of FIGS. 13A and 13B are repeated in FIGS. 14A and 14B, but for a vehicle equipped with eccentric bushings $50_U$ seated in the upper control arms $80_U$. The longer effective control arm length afforded by the use of eccentric upper control arm bushings $50_U$ is effective to constrain the effect of the bump condition shown in FIG. 14B, such that the instantaneous roll center 750 displaces vertically less than with conventional upper control arm bushings $49_U$ (shown in FIG. 13B). Vertical displacement arrow H3 in FIG. 14B represents a greater vertical displacement than does vertical displacement arrow H1 in FIG. 13A, and a lesser vertical displacement than does vertical displacement arrow H2 in FIG. 13B. Specifically, the instantaneous roll center 750 is shown as remaining above-ground, at least for the portion of the control-arm pivot illustrated in the example of FIG. 14B. In some embodiments, the instantaneous roll center 750 when using eccentric upper-control arm bushings $50_U$ remains above-ground throughout the pivot range of the bushings $50_U$. In some embodiments the instantaneous roll center 750 when using eccentric upper-control arm bushings $50_U$ remains above a lower surface of the vehicle platform 250 for at least a portion of pivot range of the bushings $50_U$.

FIGS. 15 and 16 are schematic illustrations of lateral roll-center migration, e.g., as caused by a bump condition on one side of a vehicle, based on the vehicles illustrated in a standard ride condition in FIGS. 13A and 14A, respectively. FIG. 15 shows a roll of about 4%, using conventional upper control arm bushings $49_U$. The instantaneous roll center 750 is displaced laterally and outboardwardly by a later distance indicated by arrow D1. FIG. 16 shows a roll constrained between 2% and 3% using eccentric upper control arm bushings $50_U$. The longer effective control arm length afforded by the use of eccentric upper control arm bushings $50_U$ is effective to constrain the effect of the one-sided bump condition of FIG. 16 and thus constrains the outboardward displacement of the instantaneous roll center 750, indicated by arrow D2. Lateral displacement arrow D2 in FIG. 16 represents a smaller outboardward displacement than does lateral displacement arrow D1 in FIG. 15.

Referring again to the example presented hereinabove in which an exemplary eccentric bushing provides a 16% increase in effective (virtual) control arm length, use of the eccentric upper control arm bushings $50_U$ is said example is effective to reduce roll centre migration by 34%, from 3.5 to 2.3 mm for every mm of roll.

The present invention has been described using detailed descriptions of embodiments thereof that are provided by way of example and are not intended to limit the scope of the invention. The described embodiments comprise different features, not all of which are required in all embodiments of the invention. Some embodiments of the present invention utilize only some of the features or possible combinations of the features. It will be appreciated by persons skilled in the art that the present invention is not limited to what has been particularly shown and described hereinabove. Rather, the scope of the present invention includes both combinations and sub-combinations of the various features described hereinabove, as well as variations and modifications thereof that are not in the prior art, which would occur to persons skilled in the art upon reading the foregoing description.

In the description and claims of the present disclosure, each of the verbs, "comprise", "include" and "have", and conjugates thereof, are used to indicate that the object or objects of the verb are not necessarily a complete listing of members, components, elements or parts of the subject or subjects of the verb. As used herein, the singular form "a", "an" and "the" include plural references unless the context clearly dictates otherwise.

The invention claimed is:

1. A suspension system for a vehicle platform, comprising:
    a control arm comprising an outboard portion and two inboard portions; and
    two eccentric bushings for linking the control arm to a frame of the vehicle platform, each of the two eccentric bushing being seated in one of the two inboard portions, each of the two eccentric bushings comprising:
        an annular outer sleeve seated in an opening of the respective inboard portion of the two inboard portions,
        an inner sleeve assembly surrounded by the annular outer sleeve for fixed coupling to the frame of the vehicle platform, the inner sleeve assembly being installed off-center relative to the outer sleeve, the inner sleeve being non-concentric relative to the outer sleeve, and
        an elastomeric material bonded to both the outer sleeve and the inner sleeve assembly, the elastomeric material being at least partly deformable to absorb a torque applied thereto by the outer sleeve.

2. The suspension system of claim 1, wherein each of the two eccentric bushings is oriented such that a central longitudinal axis of the inner sleeve assembly is disposed inboardward of a parallel, central axis of the opening of the respective inboard portion.

3. The suspension system of claim 1, wherein the two eccentric bushings are both oriented such that for each eccentric bushing, a maximum radial thickness of the partly filled gap is disposed outboardward of the inner sleeve assembly and the minimum radial thickness of the partly filled gap is disposed inboardward of the inner sleeve assembly.

4. A vehicle corner module (VCM) comprising the suspension system of claim 1.

5. A vehicle platform comprising a suspension system of claim 2, wherein of the two inboard portions of the control arm, a first inboard portion is a leading inboard portion and a second inboard portion is a trailing inboard portion.

6. A vehicle platform comprising first and second suspension systems according to claim 2, the first and second suspension systems mounted on opposing sides of the vehicle platform and rotated, in a horizontal plane, 180° relative to each other, wherein of the two inboard portions of the control arm of each suspension assembly, a first inboard portion is a leading inboard portion and a second inboard portion is a trailing inboard portion.

7. The vehicle platform of claim 6, wherein the eccentricity of the bushings is such that in a forward driving mode, the bushing seated in the leading inboard portion of the control arm of each of the first and second suspension assemblies provides greater stiffness than the bushing of like design and orientation seated in the opening of the respective trailing inboard portion.

8. The vehicle platform of claim 6, wherein the eccentricity of the bushings is such that in a forward driving mode, the bushing seated in the trailing inboard portion of the control arm of each of the first and second suspension assemblies provides more compliance than the bushing of like design and orientation seated in the opening of the respective leading inboard portion.

9. A vehicle platform comprising:
    a first and second vehicle corner modules (VCMs) mounted on opposite sides of the vehicle platform, the first and second VCMs comprising respective suspension assemblies rotated 180° in a horizontal plane relative to each other, each of the first and second suspension assemblies comprising a control arm, the control arm comprising two inboard portions, each of the two inboard portions comprising an opening and an eccentric bushing installed therein, each of the bushings comprising:

an annular outer sleeve seated in the opening of the respective inboard portion, an inner sleeve assembly surrounded by the outer sleeve and non-pivotably coupled to a frame of the vehicle platform, the inner sleeve assembly being installed off-center relative to the outer sleeve, the inner sleeve being non-concentric relative to the outer sleeve, and an elastomeric material bonded to both the outer sleeve and the inner sleeve assembly, molded to partly fill a gap therebetween, and at least partly deformable to absorb a torque applied thereto by the outer sleeve, a maximum radial thickness of the partly filled gap being at least twice as thick as a minimum radial thickness thereof, wherein the two respective bushings are both oriented such that for each bushing, the maximum radial thickness of the partly filled gap is disposed outboardward of the inner sleeve assembly and the minimum radial thickness of the partly filled gap is disposed inboardward of the inner sleeve assembly.

10. The vehicle platform of claim 9, wherein the eccentricity of the bushings is such that in a forward driving mode, the bushing of the leading inboard portion of the respective control arm of each of the first and second suspension provides greater stiffness than the bushing of like design and orientation seated in the opening of the respective trailing inboard portion.

11. The vehicle platform of claim 9, wherein the eccentricity of the bushings is such that in a forward driving mode, the bushing of the trailing inboard portion of the control arm of each of the first and second suspension assemblies provides more compliance than the bushing of like design and orientation seated in the opening of the respective leading inboard portion.

12. The vehicle platform of claim 9, wherein the two bushings are of substantially the same design.

13. A vehicle corner module (VCM) comprising a suspension system, the suspension system comprising a control arm and a plurality of control arm bushings installed in respective openings in a plurality of inboard portions of the control arm, wherein:

in a first orientation of the VCM, a first control arm bushing is a leading control arm bushing and a second control arm bushing is a trailing control arm bushing, and in a second orientation of the VCM that is rotated 180° in a horizontal plane relative to the first orientation, the first control arm bushing is a trailing control arm bushing and the second control arm bushing is a leading control arm bushing, and wherein each of the first and second control arm bushings comprises;

an annular outer sleeve seated in the opening of the respective inbound portion of the control arm, an inner sleeve assembly surrounded by the outer sleeve and configured for fixed coupling to a frame of a vehicle platform, the inner sleeve assembly being installed off-center relative to the outer sleeve, the inner sleeve being non-concentric relative to the outer sleeve, and an elastomeric material bonded to both the outer sleeve and the inner sleeve assembly, molded to partly fill a gap therebetween, and at least partly deformable to absorb a torque applied thereto by the outer sleeve, a maximum radial thickness of the partly filled gap being at least twice as thick as a minimum radial thickness thereof, wherein the two bushings are both oriented such that for each bushing, the maximum radial thickness of the partly filled gap is disposed outboardward of the inner sleeve assembly and the minimum radial thickness of the partly filled gap is disposed inboardward of the inner sleeve assembly.

14. The VCM of claim 13, wherein the VCM is configured to be mounted on a first side of a vehicle platform when in the first orientation, and is configured to be mounted on a second side of the VCM when in the second orientation.

15. The VCM of claim 14, wherein the respective inner sleeve assemblies of the control arm bushings are non-pivotably coupled to the frame of the vehicle platform.

16. The VCM of claim 13, wherein the first and second control arm bushings are of substantially the same design.

17. A vehicle platform comprising:

a first and second vehicle corner modules (VCMs) mounted on opposite sides of the vehicle platform, the first and second VCMs comprising suspension assemblies, each of the suspension assemblies comprising a control arm, the control arm comprising two inboard portions, each of the inboard portions comprising an eccentric bushing installed in an opening of the respective inboard portion, an inner sleeve assembly of the respective bushing being installed off-center relative to an outer sleeve of the respective bushing such that the inner sleeve assembly of the respective bushing is non-concentric relative to the outer sleeve of the respective bushing, each of the bushings of the control arm being oriented such that for each bushing a central longitudinal axis of the respective bushing is disposed inboardward of a parallel central axis of the respective opening, wherein, when a respective at least partly vertical force is received by an outboard portion of the respective control arms of the suspension assemblies to pivot the control arms about the respective bushings, each of the control arms is constrained to pivot eccentrically about respective virtual pivot axes that are displaced inboardward from central axes of inner sleeve assemblies of the two respective bushings installed in the inboard-portion openings of each of the control arms, and the eccentric pivoting of the control arms about the respective virtual pivot axes extends an effective length of each control arm, and is effective to constrain a negatively vertical displacement of a roll center of the vehicle platform.

18. The vehicle platform of claim 17, wherein the virtual pivot axes are displaced inboardward by the eccentric pivoting.

19. A vehicle platform comprising:

first and second vehicle corner modules (VCMs) mounted on opposite sides of the vehicle platform, the first and second VCMs comprising suspension assemblies, each of the respective suspension assemblies comprising a control arm, the control arm including two inboard portions, each inboard portion including an eccentric bushing installed in an opening of the respective inboard portion, an inner sleeve assembly of the respective bushing being installed off-center relative to an outer sleeve of the respective bushing such that the inner sleeve assembly of the respective bushing is non-concentric relative to the outer sleeve of the respective bushing, each of the bushings of the control arm being oriented such that for each bushing a central longitudinal axis of the respective bushing is disposed inboardward of a parallel central axis of the respective opening, wherein, when an at least partly vertical force is received by an outboard portion of the respective control arm of a single suspension assembly to pivot the control arm about the respective bushings, the control arm of the single suspension assembly is constrained to pivot eccentrically about respective virtual pivot axes that are displaced inboardward from the central axes of inner sleeve assemblies of the two bushings installed in the inboard-portion openings of the control arm, and the eccentric pivoting of the control arm about the respective virtual pivot axes extends an effective length of the control arm, and is effective to constrain an outboardward displacement of a roll center of the vehicle platform.

20. The vehicle platform of 19, wherein each of the eccentric bushings comprises (i) an annular outer sleeve seated in the respective opening, (ii) an inner sleeve assembly nonconcentrically surrounded by the outer sleeve and non-pivotably coupled to a frame of the vehicle platform, and (iii) an elastomeric material bonded to both the outer sleeve and the inner sleeve assembly, molded to partly fill a gap therebetween, and at least partly deformable to absorb a torque applied thereto by the outer sleeve, and wherein each of the bushings installed in the openings of the inboard portions is oriented such that a maximum radial thickness of the partly filled gap is disposed outboardward of the inner sleeve assembly and the minimum radial thickness of the partly filled gap is disposed inboardward of the inner sleeve assembly.

* * * * *